US 11,886,822 B2

(12) United States Patent
Creed et al.

(10) Patent No.: US 11,886,822 B2
(45) Date of Patent: Jan. 30, 2024

(54) HIERARCHICAL RELATIONSHIP EXTRACTION

(71) Applicant: BENEVOLENTAI TECHNOLOGY LIMITED, London (GB)

(72) Inventors: Paidi Creed, London (GB); Aaron Jefferson Khey Jin Sim, London (GB)

(73) Assignee: BenevolentAI Technology Limited, London (GB)

(*) Notice: Subject to any disclaimer, the term of this patent is extended or adjusted under 35 U.S.C. 154(b) by 407 days.

(21) Appl. No.: 17/268,124

(22) PCT Filed: Sep. 26, 2019

(86) PCT No.: PCT/GB2019/052721
§ 371 (c)(1),
(2) Date: Feb. 12, 2021

(87) PCT Pub. No.: WO2020/065326
PCT Pub. Date: Apr. 2, 2020

(65) Prior Publication Data
US 2021/0312134 A1     Oct. 7, 2021

(30) Foreign Application Priority Data
Sep. 26, 2018  (GB) .................................... 1815664

(51) Int. Cl.
*G06F 40/30*     (2020.01)
*G06F 16/35*     (2019.01)
(Continued)

(52) U.S. Cl.
CPC ............ *G06F 40/30* (2020.01); *G06F 16/358* (2019.01); *G06F 40/237* (2020.01); *G06F 40/279* (2020.01); *G06N 20/00* (2019.01)

(58) Field of Classification Search
CPC ...... G06F 40/30; G06F 16/358; G06F 40/237; G06F 40/279; G06N 20/00; G06N 3/045
See application file for complete search history.

(56) References Cited

U.S. PATENT DOCUMENTS 10,565,498 B1 *  2/2020  Zhiyanov ............... G06N 3/045
2018/0121799 A1    5/2018  Hashimoto et al.
(Continued)

FOREIGN PATENT DOCUMENTS

EP          3173983 A1       5/2017

OTHER PUBLICATIONS

European Examination Report issued in connection with related European Patent Application no. 1983097.9 dated Dec. 21, 2021.
(Continued)

*Primary Examiner* — Abul K Azad
(74) *Attorney, Agent, or Firm* — Smith Baluch LLP

(57) ABSTRACT

Methods, apparatus, system and computer-implemented method are provided for embedding a portion of text describing one or more entities of interest and a relationship. The portion of text describes a relationship for the one or more entity(ies) of interest, where the portion of text includes multiple separable entities describing the relationship and the entity(ies). The multiple separable entities including the one or more entity(ies) of interest and one or more relationship entity(ies). A set of embeddings for each of the separable entities is generated, where the set of embeddings for a separable entity includes an embedding for the separable entity and an embedding for at least one entity associated with the separable entity. One or more composite embeddings may be formed based on at least one embedding from each of the sets of embeddings. The composite embedding(s) may be sent for input to a machine learning model or classifier.

33 Claims, 13 Drawing Sheets

(51) Int. Cl.
    *G06N 20/00*     (2019.01)
    *G06F 40/279*     (2020.01)
    *G06F 40/237*     (2020.01)

(56) References Cited

U.S. PATENT DOCUMENTS

| | | | |
|---|---|---|---|
| 2018/0253496 A1* | 9/2018 | Natchu | G06F 16/951 |
| 2021/0065702 A1* | 3/2021 | Fink | G06N 3/08 |
| 2021/0232768 A1* | 7/2021 | Ling | G06F 40/295 |

OTHER PUBLICATIONS

PCT International Written Opinion and Search Report issued in related PCT/GB2019/052721 dated Dec. 19, 2019.

* cited by examiner

HIERARCHICAL RELATIONSHIP EXTRACTION

CROSS-REFERENCE TO RELATED PATENT APPLICATIONS

This patent application is the 35 U.S.C. 371 national stage of International Patent Application PCT/GB2019/052721 filed 26 Sep. 2019; which claims the benefit of priority to GB 1815664.6 filed 26 Sep. 2018, which is incorporated by reference herein for all purposes.

The present application relates to a system and method for hierarchical relationship extraction.

BACKGROUND

When training machine learning (ML) techniques to generate ML models or classifiers for prediction and the like (e.g. extraction of relations between biological entities from biological literature and the like; predicting relationships there between, etc.) the training data may only include specific examples of one or more entities (e.g. disease and gene pairs) and the relationships there between. Current training data is specific and each training data instance or item is representative of a specific sentence or portion of text from a corpus of text such as, by way of example only but not limited to, a corpus of biological literature.

Each training data item may be labelled with a label from a set of labels characterising that training data item. For example, a training data item may include data representative of, byway of example only but is not limited to, a portion of text (e.g. "Alzheimer's disease treated by modulating LRP1", which is known to be true) indicating a first biological entity (e.g. "Alzheimer's Disease") and a second biological entity (e.g. "LRP1") linked by a relationship (e.g. "treated by modulating"). If the portion of text is known to be true, then the training data item may be labelled with a label '1' from the set of labels {0,1}, where '0' indicated the portion of text is false and '1' indicates the portion of text is true. This may be performed for each portion of text that may be retrieved from a corpus of text for generating a specific labelled training dataset.

Typically, an ML model or classifier will be trained by a ML technique on such a specific labelled training dataset. Once trained, the ML model may be able to, by way of example only but is not limited to, predict whether a relationship between biological entities is true or false, or extract further relationships from a corpus of text, or anything else that it has been trained to perform based on the specific labelled training dataset. Alternatively, once trained an ML classifier may be able to, by way of example only but is not limited to, classify sentences extracted from a corpus of biological literature based on similar or the same types of sentences seen during training.

However, any ML model or classifier trained on specific labelled training data is less likely to handle or recognise nuances or generic examples of entities and/or relationships when handling unknown portions of text describing relationships between unknown combinations of entities (e.g. diseases, treatments, and/or genes and the like) and/or relationships compared with the specific labelled training dataset used to train the ML model or classifier. Most ML models and/or classifiers when trained on specific labelled training datasets become biased towards the training data instances and cannot readily handle or cope with text or literature that is outside the scope of the specific labelled training dataset.

There is a desire for a ML model and/or classifier to be able to be trained to robustly handle more generalised queries and/or a wider range of input data for identifying, whilst retaining its specific knowledge. There is a further desire for efficiently generating input embeddings of labelled training data and/or queries that enhances the robustness and accuracy of ML models and/or classifiers during training and in decision directed mode (e.g. test mode).

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides a system, apparatus and method for enhancing relationship extraction by changing the embedding of input datasets such as sentences whereby a composite embedding of each sentence is generated, each sentence describing a specific relationship with one or more entity(ies) of interest, the composite embedding including data representative of an embedding for the specific relationship and entity(ies) of interest whilst simultaneously including embeddings for one or more relationships and entity(ies) of interest associated with the specific relationship and entity(ies) of interest. The composite embedding technique may be used as an input front-end for enhancing training of machine learning (ML) techniques or classification for relationship extraction and the like.

In a first aspect, the present disclosure provides a computer-implemented method for embedding a portion of text describing a relationship for one or more entity(ies) of interest, the method comprising: receiving a portion of text comprising data representative of a relationship for the one or more entity(ies) of interest, wherein the portion of text comprises multiple separable entities including one or more relationship entity(ies) and the one or more entity(ies) of interest; generating a set of embeddings for each of the multiple separable entities, wherein each set of embeddings comprises an embedding of the separable entity and at least one embedding of an entity associated with the separable entity; and sending at least one embedding from each of the sets of embeddings for input to a machine learning, ML, model or classifier.

Some embodiments of the computer-implemented method of the first aspect have additional features. In one or more embodiments, the computer-implemented method may further include forming a composite embedding for the received portion of text, the composite embedding comprising combining at least one embedding from each of the multiple sets of embeddings associated with the received portion of text; and sending the composite embedding of the received portion of text for input to the ML model or classifier. In one or more embodiments the computer-implemented method may further include: forming a composite embedding for the received portion of text, the composite embedding comprising combining all the multiple sets of embeddings associated with the received portion of text; and sending the composite embedding of the received portion of text for input to the ML model or classifier. In one or more embodiments of the computer-implemented method the portion of text comprises at least one from the group of: a labelled training data item comprising data representative of one or more entities of interest and one or more relationship entities associated with a label for training the ML model or classifier; and a query comprising data representative of one or more entities of interest and one or more relationship entities for inputting to a trained ML model or classifier. In one or more embodiments the computer-implemented method may further include storing the generated sets of embeddings in an embedding vocabulary dataset, wherein the embedding vocabulary dataset comprises data representative of one or more entity(ies) mapped to one or more corresponding embeddings. In one or more embodiments of the computer-implemented method the embedding vocabulary dataset further comprises a mapping from each of the one or more entity(ies) associated with a separable entity to said separable entity. In one or more embodiments the computer-implemented method may further include: generating the embedding vocabulary dataset based on training an embedding model using a labelled training dataset representative of a plurality of portions of text, the labelled training dataset comprising a plurality of labelled training data items, each labelled training data item comprising data representative of multiple separable entities including the one or more relationship entity(ies) and the one or more entity(ies) of interest associated with at least one of the portions of text. In one or more embodiments of the computer-implemented method the step of generating the embedding vocabulary dataset may further include: iteratively training the embedding ML model and the ML model or classifier based on the labelled training dataset, the embedding ML model configured to generate a plurality of sets of embeddings associated with the labelled training dataset for inputting to the ML model or classifier during training; and extracting, from the embedding ML model, the generated sets of embeddings; and storing the extracted sets of embeddings as the embedding vocabulary dataset. In one or more embodiments of the computer-implemented method the embedding ML model, or the ML model or classifier are based on at least one or more ML techniques from the group of: feedforward neural network(s); recursive neural network(s); convolutional neural network(s); autoencoder neural network(s); any one or more neural network structure(s) based on tensor factorization; any one or more neural network structure(s) based on projecting data representative of entity(ies) into a latent vector space; any one or more neural network structures capable of embedding data or suitable for the embedding ML model as the application demands; and any one or more neural network structures suitable for the corresponding ML model or classifier as the application demands. In one or more embodiments of the computer-implemented method the step of generating the set of embeddings for a separable entity further comprising: retrieving, from the embedding vocabulary dataset, one or more embedding(s) of entities associated with the separable entity; and forming a set of embeddings associated with said separable entity based on the retrieved one or more embeddings. In one or more embodiments of the computer-implemented method the step of retrieving one or more embeddings associated with a separable entity from the embedding vocabulary dataset further comprising: determining whether an embedding corresponding to each of the separable entity and one or more entity(ies) associated with the separable entity exists in the embedding vocabulary dataset; retrieving those embeddings associated with the separable entity that exist in the embedding vocabulary dataset; generating out-of-vocabulary embeddings for those embeddings associated with the separable entity that are not found in the embedding vocabulary dataset; and generating a set of embeddings for said separable entity based on at least one of any retrieved embedding(s) and any generated out-of-vocabulary embedding(s).

In one or more embodiments of the computer-implemented method of the first aspect, the step of generating the set of embeddings for each of the multiple separable entities, the multiple separable entities including one or more separable relationship entity(ies) and the one or more separable entity(ies) of interest associated with a portion of text, further comprising: generating a set of embeddings for each of the separable entity(ies), wherein each set of embeddings comprises a specific embedding element and one or more further embedding element(s), the specific embedding element corresponding to the embedding of one of the entity(ies) of interest of the portion of text and each further embedding element corresponding to an embedding of a further entity associated with said one of the entity(ies) of interest; and generating a set of relationship embeddings for each of the one or more separable relationship entity(ies), wherein each set of relationship embeddings comprises a specific relationship embedding element and one or more further relationship embedding element(s), the specific relationship element corresponding to an embedding of one of the separable relationship entity(ies), and each further relationship embedding element corresponding to an embedding of a relationship entity associated with said one of the separable relationship entity(ies). In one or more embodiments the computer-implemented method may further include forming a composite embedding for the received portion of text based on combining the one or more set(s) of embeddings of interest and the one or more set(s) of relationship embeddings. In one or more embodiments the computer-implemented method may further include each of the sets of embeddings for the multiple separable entities comprises an embedding vector, the embedding vector comprising multiple sub-vectors associated with the embeddings of the separable entity and the at least one embedding of the entity(ies) associated with the separable entity. In one or more embodiments the computer-implemented method may further include the multiple sub-vectors comprising: a specific sub-vector comprising data representative of the embedding of the separable entity; and a further sub-vector comprising data representative of the embedding of the at least one entity associated with the separable entity. In one or more embodiments the computer-implemented method may further include inputting at least one embedding from each of the sets of embeddings to an ML model or classifier trained for predicting whether there is evidence supporting the relationship of the portion of text. In one or more embodiments the computer-implemented method may further include forming a composite embedding based on the sets of embeddings for each of a plurality of portions of text, and inputting the composite embedding to a ML model or classifier trained for predicting whether there is evidence supporting the relationship of the portion of text. In one or more embodiments the computer-implemented method may further include the portion of text comprises one or more unknown entity(ies) associated with one or more relationship entity(ies) of a relationship. In one or more embodiments the computer-implemented method may further include forming a composite embedding based on the sets of embeddings for each of a plurality of portions of text, and inputting each composite embedding to an ML model or classifier trained for identifying a particular relationship for one or more entity(ies) of interest, the ML model or classifier configured to output evidence for each of the plurality of portions of text exhibiting the particular relationship. In one or more embodiments of the computer-implemented method, generating a set of embeddings further comprises: generating each embedding of a set of embeddings for a separable entity separately; or generating the embedding of a set of embeddings for a separable entity jointly.

In a second aspect, the present disclosure provides a computer-implemented method of generating an embedding vocabulary dataset for embedding one or more portions of text describing a relationship for one or more entities of interest, the method comprising: receiving a labelled training data item corresponding to a portion of text, the labelled training data item comprising data representative of multiple separable entities including one or more relationship entity(ies) and one or more entity(ies) of interest associated with the portion of text; generating, using an ML embedding model, a set of embeddings for each of the multiple separable entities, wherein a set of embeddings for a separable entity comprises an embedding for the separable entity and an embedding for at least one entity associated with the separable entity; sending the set of embeddings associated with the labelled training data item for training a machine learning, ML, model or classifier; and updating the ML embedding model based on the output of the ML model or classifier during training.

Some embodiments of the computer-implemented method of the second aspect have additional features. In one or more embodiments of the computer-implemented method, the step of generating the set of embeddings further comprising: iteratively training the embedding ML model and corresponding ML model or classifier based on a labelled training dataset comprising a plurality of labelled training data items, each labelled training data item comprising data representative of multiple separable entities including the one or more relationship entity(ies) and the one or more entity(ies) of interest associated with a portion of text; and extracting, from the embedding ML model, one or more generated sets of embeddings; and storing the extracted sets of embeddings in the embedding vocabulary dataset. In one or more embodiments, the computer-implemented method may further include storing the generated sets of embeddings in the embedding vocabulary dataset, the embedding vocabulary dataset comprising data representative of one or more entity(ies) mapped to one or more corresponding embeddings. In one or more embodiments of the computer-implemented method, the embedding vocabulary dataset further comprises a mapping from each of the one or more entity(ies) associated with a separable entity to said separable entity.

In a third aspect, the present disclosure provides an apparatus for embedding a portion of text comprising data representative of a relationship for one or more entities of interest, the apparatus comprising a processor coupled to a communication interface, wherein: the communication interface is configured to receive data representative of the portion of text, wherein the portion of text comprises multiple separable entities including one or more relationship entity(ies) and the one or more entity(ies) of interest; the processor is configured to generate a set of embeddings for each separable entity, wherein each set of embeddings comprises at least one embedding of the separable entity and one or more embedding(s) of an entity associated with the separable entity; and the communication interface is configured to send at least one embedding from each of the sets of embeddings for input to a machine learning, ML, model or classifier.

Some embodiments of the apparatus of the third aspect have additional features. In one or more embodiments of the apparatus, the communication interface and processor are further configured to implement the computer-implemented method of the first and/or second aspects, one or more additional features and/or embodiments thereof, modifications thereof, combinations thereof, and/or as described herein.

In a fourth aspect, the present disclosure provides an apparatus for generating an embedding vocabulary dataset for embedding one or more portions of text describing a relationship for one or more entities of interest, the apparatus comprising a processor coupled to a communication interface, wherein: the communication interface is configured to receive a label training data item corresponding to a portion of text, the labelled training data item comprising data representative of multiple separable entities including one or more relationship entity(ies) and one or more entity(ies) of interest associated with the portion of text; the processor is configured to: generate, using an ML embedding model, a set of embeddings for each of the multiple separable entities, wherein a set of embeddings for a separable entity comprises an embedding for the separable entity and an embedding for at least one entity associated with the separable entity; the communication interface is configured to send at least one embedding from each of the sets of embeddings associated with the labelled training data item for input to train a machine learning, ML, model or classifier; the processor is further configured to update the ML embedding model based on the ML model or classifier output during training.

Some embodiments of the apparatus of the fourth aspect have additional features. In one or more embodiments of the apparatus, the communication interface and processor are further configured to implement the computer-implemented method of the first and/or second aspects, one or more additional features and/or embodiments thereof, modifications thereof, combinations thereof, and/or as described herein.

In a fifth aspect, the present disclosure provides a system comprising: an embedding module or apparatus based on the third aspect and/or fourth aspect, one or more additional features and/or embodiments thereof, modifications thereof, combinations thereof, and/or as described herein, the embedding module or apparatus configured to generate a composite embedding for a portion of text; and a machine learning module configured to receive the composite embedding for further processing.

Some embodiments of the apparatus of the fifth aspect have additional features. In one or more embodiments, the portion of text includes at least one from the group of: a labelled training data item comprising one or more entities of interest and one or more relationship entities associated with a label for use by the ML module in training a ML model or classifier; and a query comprising one or more entities of interest and one or more relationship entities for inputting to a trained ML model or classifier of the ML module.

In a sixth aspect, the present disclosure provides an apparatus comprising a processor and a communication interface, the processor coupled to the communication interface, wherein the processor and communication interface are configured to implement the computer-implemented method according to any of the first and/or second aspects, one or more additional features and/or embodiments thereof, combinations thereof, modifications thereof, and/or as herein described.

In a seventh aspect, the present disclosure provides a system comprising at least one apparatus configured to implement the computer-implemented method according to any of the first and/or second aspects of the invention, one or more additional features and/or embodiments thereof, combinations thereof, modifications thereof, and/or as herein described.

Some embodiments of the system of the fifth or seventh aspects have additional features. In one or more embodiments, the system may include a first apparatus that is configured as an embedding module based on the first and/or second aspects, one or more additional features and/or embodiments thereof, combinations thereof, modifications thereof, and/or as herein described, the embedding module configured to generate a composite embedding for a portion of text; and a second apparatus is a machine learning module configured to receive the composite embedding for further processing. As an option, the first and second apparatus may be the same or different apparatus.

In one or more embodiments of the computer-implemented method, apparatus and/or system of any of the first, second, third, fourth, fifth, sixth and/or seventh aspects, each entity associated with a separable entity is selected from an entity association data structure comprising a plurality of entities including one or more specific separable entity(ies), wherein at least one entity of the plurality of entities is associated with each of the one or more specific separable entity(ies).

In one or more embodiments of the computer-implemented method, apparatus and/or system of any of the first, second, third, fourth, fifth, sixth and/or seventh aspects, the entity association data structure is based on at least one or more from the group of: a hierarchical tree or graph; an ontology; a tagging system; a syntax tree or grammar tree; a list of entity(ies) associated with one or more specific separable entity(ies); a data structure comprising data representative of a plurality of entities, the plurality of entities including one or more separable entity(ies), wherein the data structure includes a mapping between each of the plurality of entity(ies) that are associated with one or more other entity(ies) of the plurality of entity(ies); any other rule or data structure for selecting an entity associated with the specific separable entity.

In one or more embodiments of the computer-implemented method, apparatus and/or system of any of the first, second, third, fourth, fifth, sixth and/or seventh aspects, an entity of interest comprises an entity data item associated with an entity type from at least the group of: bioinformatics; chem(o)informatics; data informatics; social media; entertainment; geographical; any other entity type in which a portion of text comprises data representative of a relationship for one or more entity(ies) of interest.

In one or more embodiments of the computer-implemented method, apparatus and/or system of any of the first, second, third, fourth, fifth, sixth and/or seventh aspects, an entity of interest is associated with one or more fields from at least the group of: bioinformatics; chem(o)informatics; data informatics; social media; entertainment; geographical; any other field in which a portion of text comprises data representative of a relationship for one or more entity(ies) of interest.

In one or more embodiments of the computer-implemented method, apparatus and/or system of any of the first, second, third, fourth, fifth, sixth and/or seventh aspects, an entity of interest comprises entity data associated with an entity type from at least the group of: gene; disease; compound/drug; protein; cell-line; chemical, organ, biological; or any other entity type associated with bioinformatics or chem(o)informatics and the like.

In further aspects, the present disclosure provides a computer-readable medium comprising program and/or instruction code stored thereon which, when executed on a processor, causes the processor to implement any of the computer-implemented methods of the first and/or second aspects, one or more additional features and/or embodiments thereof, combinations thereof, and/or modifications thereof, and/or methods and/or processes as herein described. The computer-readable medium may be a tangible computer-readable medium.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The features of each of the above aspects and/or embodiments may be combined as appropriate, as would be apparent to a skilled person, and may be combined with any of the aspects of the invention. Indeed, the order of the embodiments and the ordering and location of the preferable features is indicative only and has no bearing on the features themselves. It is intended for each of the preferable and/or optional features to be interchangeable and/or combinable with not only all of the aspect and embodiments, but also each of preferable features.

BRIEF DESCRIPTION OF THE DRAWINGS

Embodiments of the invention will be described, by way of example, with reference to the following drawings, in which.

Figure 1A:
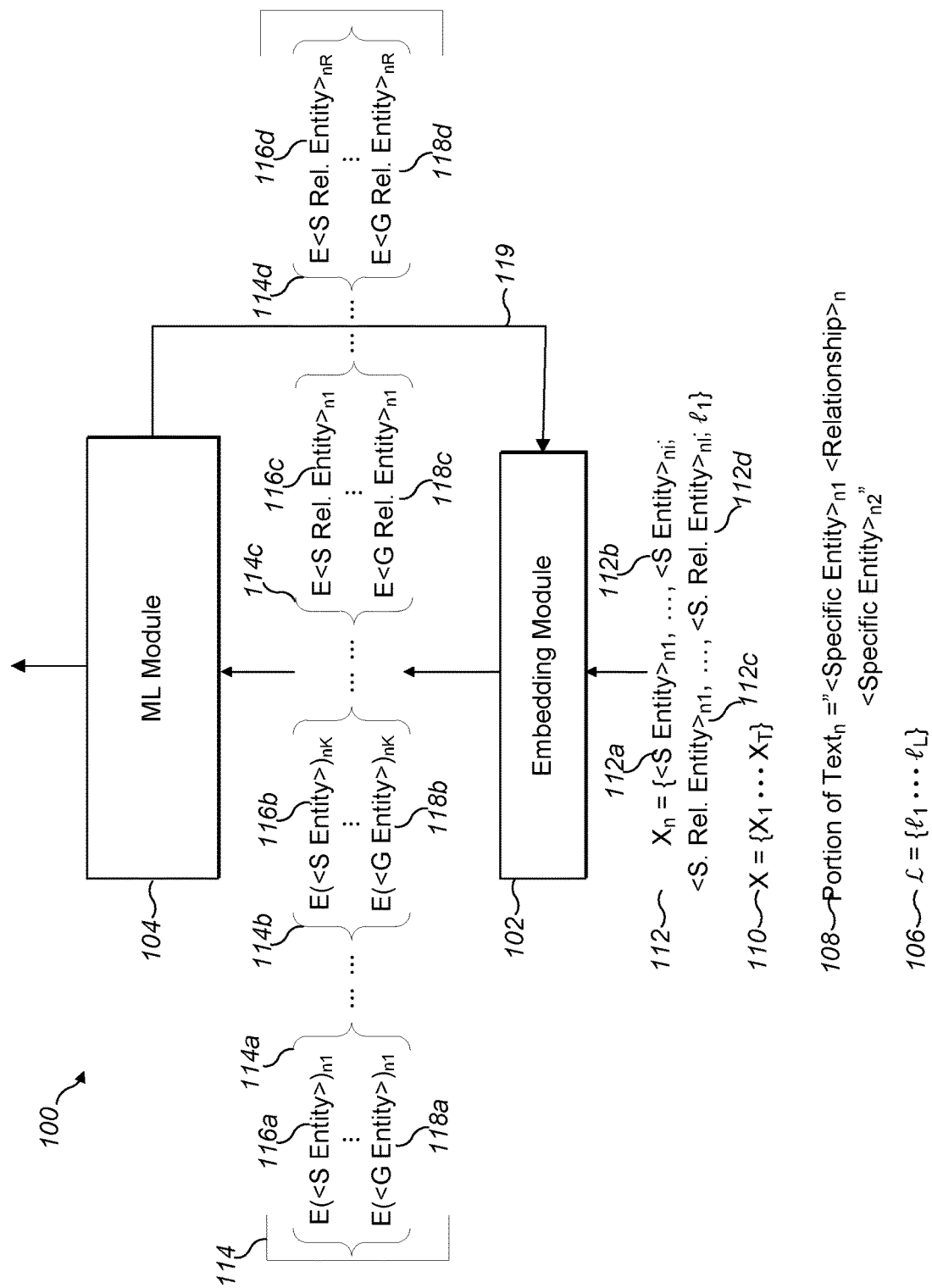
FIG. 1a is a schematic diagram illustrating an example embedding system according to the present disclosure.

Common reference numerals are used throughout the figures to indicate similar features. It should however be noted that even where reference numerals for features used throughout the figures vary, this should not be construed as non-interchangeable or distinct. Indeed, unless specified to the contrary, all features referring to similar components and/or having similar functionalities of all embodiments are interchangeable and/or combinable.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples. For the avoidance of any doubt, the features described in any embodiment are combinable with the features of any other embodiment and/or any embodiment is combinable with any other embodiment unless express statement to the contrary is provided herein. Simply put, the features described herein are not intended to be distinct or exclusive but rather complementary and/or interchangeable.

For a corpus of text, or a plurality of portions of text, there may be a plurality of entity types of interest in which each entity type has a corresponding set of entities that may be identified and/or extracted from the corpus of text. When these entities are identified/extracted from a portion of text and labelled to be a particular entity type of interest, then these entities may be used in many applications such as knowledge bases, literature searches, entity-entity knowledge graphs, relationship extraction, machine learning techniques and models, and other processes useful to researchers such as, by way of example only but is not limited to, researchers in the fields of bioinformatics, chem(o)informatics, drug discovery and optimisation and the like.

An entity type may comprise or represent a label or name given to a set of entities that may be grouped together and share one or more characteristics, rules and/or properties and/or are considered to be listed under the same entity type. For example, in the bioinformatics and/or chem(o)informatics fields entity types may include at least one entity type from at least one of, by way of example only but is not limited to, a disease, gene, protein, compound, chemical, drug, biological pathway, biological process, anatomical region or entity, tissue, cell-line, or cell type, or any other biological or biomedical entity and the like; or any other entity type of interest associated with bioinformatics or chem(o)informatics entities and the like. In the data informatics fields and the like, an entity type may include, by way of example but not limited to, at least one entity type from the group of: news, entertainment, sports, games, family members, social networks and/or groups, emails, transport networks, the Internet, Wikipedia pages, documents in a library, published patents, databases of facts and/or information, and/or any other information or portions of information or facts that may be related to other information or portions of information or facts and the like.

An entity of interest may comprise or represent an object, item, word or phrase, piece of text, or any portion of information or a fact that may be associated with a particular entity type and be associated with a relationship. An entity of interest may be, by way of example only but is not limited to, any portion of information or a fact that has a relationship, or a fact that has a relationship with another entity of interest, by way of example only but is not limited to, one or more portions of information or another one or more facts and the like. For example, in the biological, chem(o)informatics or bioinformatics space(s) an entity of interest may comprise or represent an entity based on an entity type such as, by way of example only but is not limited to, a disease, gene, protein, compound, chemical, drug, biological pathway, biological process, anatomical region or entity, tissue, cell-line, or cell type, or any other biological or biomedical entity and the like. For example, a biological entity of the biological entity type may be represented by data representative of a portion of text that describes or is descriptive of that biological entity type based on the context of the text portion or text in which that entity resides. A biological entity may include entity data associated with an biological entity type from one or more of the group of: gene; disease; compound/drug; protein; cells; chemical, organ, biological; or any other entity type associated with bioinformatics or chem(o)informatics and the like.

In another example, entities of interest associated with a set or corpus of patents, literature, citations or a set of clinical trials that are related to a disease or a class of diseases. In another example, in the data informatics fields and the like, an entity of interest may comprise or represent an entity associated with data informatics entity types such as, by way of example but not limited to, news, entertainment, sports, games, family members, social networks and/or groups, emails, transport networks, the Internet, Wikipedia pages, documents in a library, published patents, databases of facts and/or information, and/or any other information or portions of information or facts that may be related to other information or portions of information or facts and the like.

One or more entity(ies) of interest and relationship(s) associated with the one or more entity(ies) of interest may be extracted from a corpus of information such as, by way of example but is not limited to, a corpus of text or portions of text, literature, documents; database of patents or patent applications; web-pages; distributed sources such as the Internet; a database of facts and/or relationships; and/or expert knowledge base systems and the like; manually curated text or portions of text; and/or any other system or corpus storing and/or capable of retrieving portions of information or facts (e.g. entities of interest) that may be related to (e.g. relationships) other information or portions of information or facts (e.g. other entities of interest) and the like.

The invention relates to an efficient embedding technique for generating a composite embedding from a portion of text including data representative of a relationship with one or more entities of interest. The composite embedding is configured to enable a ML technique that is training an ML model or classifier to learn both specific and generic patterns and nuances describing the at least the one or more entities of interest for one or more particular entity type(s) (e.g. biological entity of interest associated with an entity type of disease, gene, protein, target, drug etc.) and at least one or more relationship entities associated with the relationship during training. Afterwards, once trained, the embedding technique generates composite embeddings of text portions/queries for input to the trained ML model or classifier to allow the ML model or classifier to more reliably and accurately handle text portions/queries not seen during training.

This may be achieved by both: retrieving the separable entity(ies) associated with the entity(ies) of interest and the relationship entity(ies) associated with the entity(ies) of interest, and determining a set of embeddings for each separable entity, where each set of embeddings includes data representative of an embedding for the separable entity and embeddings for one or more entity(ies) associated with the separable entity.

For example, one or more entity data structures may be used for representing or mapping a plurality of entities of one or more entity types in which the entities are associated with each other. For example, a data structure based on, by way of example only but is not limited to, entity ontologies/hierarchies/tagging systems for representing a plurality of entities of a particular entity type or one or more entity types that are associated with each other in which one or more of the entities are genericised and/or specificised versions of each other. For example, hierarchical tree(s) or graph(s) of entities for a particular entity type or one or more entity types may be used for representing a plurality of entity(ies) associated with one or more other entity(ies). Each node of the hierarchical tree or graph represents an entity of the plurality of entities, and each child node of a parent node represents an entity associated with the entity of the parent node, but which is described more specifically than the entity of the parent node. When given an entity of the plurality of entities, a hierarchical graph or tree may be used to select one or more entities associated with the given entity that are more generically and/or more specifically described, e.g. genericised or specificised, compared with the entity of interest. For example, an entity may be genericised by parsing the hierarchical tree from the node representing the entity towards the root node and selecting one or more parent entity nodes (or ancestor node(s)) as genericised versions of the entity. An entity may be specificised by parsing the hierarchical tree from the node representing the entity away from the root node towards the leaf nodes of the hierarchical graph or tree and selecting one or more child entity nodes (or descendent node(s)) as specificised versions of the entity.

For example, for entities of interest associated with the disease or gene entity type(s), in which the hierarchical tree or graph may be based on a disease or gene ontology in which a node at a certain level in the disease or gene ontology tree/graph describes the entity of interest at a certain level of genericity or specificity, each parent node (or one or more ancestor node(s)) describing the entity of interest more generically, and each child node (or one or more descendent node(s)) describing the entity of interest more specifically. Example ontologies for specific biological entities may include, by way of example only but are not limited to, one or more gene ontologies for entity(ies) of the gene entity type such as, by way of example only but are not limited to, Gene Ontology (GO) from the Gene Ontology Consortium, GENIA ontology (e.g xGENIA)—GENIA ontology may further include relationships between genes, and the like; one or more disease ontologies for entity(ies) of the disease entity type such as, by way of example only but are not limited to, The Disease Ontology (DO) from Northwestern University, Center for Genetic Medicine and the University of Maryland School of Medicine, Institute for Genome Sciences; one or more biological/biomedical entity ontologies or any other entity ontology based on, by way of example only but not limited to, the ontologies from the Open Biological and Biomedical Ontology (OBO) Foundry, which includes ontologies such as, by way of example only but not limited to, the Protein Ontology (https://www.ncbi.nlm.nih.gov/pmc/articles/PMC3013777/), or any type of ontology based on those from the Ontology Lookup Service (OLS) from European Molecular Biology Laboratory-European Bioinformatics Institute (EMBL-EBI), which includes ontologies associated with biological/biomedical entity types including, by way of example only but not limited to, gene, genomics, gene expression and the like; anatomical entities; disease, human disease and the like; antibiotic resistance; compound/drug; protein; cell; chemical; organ; food; biological; biomedical; or any other entity type associated with bioinformatics or chem(o)informatics and the like.

A relationship may be described by one or more relationship entity(ies) using a hierarchical tree or graph based on a grammar or syntax tree and/or a thesaurus or graph of synonyms describing each of the relationship entity(ies) in which a node at a certain level in the tree describes the relationship entity at a certain level of genericity or specificity, each parent node describes the relationship entity more generically, and each child node described the relationship entity more specifically.

Generating a composite embedding for a portion of text describing one or more separable entity(ies) of interest and one or more separable relationship entity(ies) associated with the relationship corresponding to the entity(ies) of interest may be achieved by both: genericising and/or specificising each separable entity in the portion of text; generating one or more embeddings for each separable entity and the associated genericised or specificised entities associated with the separable entity; and merging one or more embeddings associated with each of the separable entities to form a composite embedding. For example, the portion of text may include one or more biological entities of interest and a corresponding relationship described by one or more relationship entity(ies). The biological entities may be included in an biological entity hierarchical tree, graph or ontology, thus each biological entity of interest may be genericised or specificised by parsing the biological entity hierarchical tree and selecting one or more generic and/or specific entity(ies) associated with the biological entity of interest from the hierarchical entity graph or tree (or entity ontology/hierarchy/tagging data structure). As well, each separable relationship entity (or non-biological entity) of the portion of text may be genericised or specificised by parsing a relationship hierarchical tree or graph such as, by way of example only but not limited to, grammar tree, syntax tree, list of synonyms or synonym structures, or word or phrase ontologies, hierarchy, tagging systems and the like associated with the relationship in the portion of text corresponding to the one or more biological entities of interest. For example, a grammar tree and list of synonyms associated with each relationship and relationship entity may be parsed and used to generate genericised and/or specificised entities associated with each separable relationship entity. For a particular relationship entity and/or relationship, the entity(ies) associated with the relationship entity may include, by way of example only but is not limited to, synonyms associated with the relationship entity, conjunctions, verbs, nouns and other synonyms, syntax or grammar terms associated with the relationship entity.

Generating a composite embedding for a portion of text describing one or more separable entity(ies) of interest and one or more separable relationship entity(ies) associated with a relationship corresponding to the entity(ies) of interest may be achieved by: a) genericising and/or specificising each separable entity of interest in the portion of text by parsing the hierarchical tree/graph associated with each separable entity of interest towards the root node; b) genericising and/or specificising each separable relationship entity in the portion of text by parsing the corresponding hierarchical tree/graph associated with each separable relationship entity towards the root node; c) generating a set of embeddings for each separable entity of interest including an embedding for the separable entity of interest and one or more embeddings associated with genericised or specificised entity(ies) associated with the separable entity of interest; d) generating a set of embeddings for each separable relationship entity including an embedding for the separable relationship entity and one or more embeddings associated with genericised or specificised entity(ies) associated with the separable relationship entity; e) forming a composite embedding by combining or merging one or more embeddings from each set of embeddings.

A portion of text may describe a relationship associated with one or more entity(ies) of interest. The portion of text may be processed to extract: a) the one or more entity(ies) of interest, which are called separable entities of interest; and b) one or more relationship entity(ies) that define the relationship, which may be called separable relationship entity(ies). A set of embeddings for each separable entity (e.g. one or more entity(ies) of interest and/or relationship entity(ies)) found in the portion of text may be generated based on using any type of machine learning technique, model or classifier such as, by way of example only but not limited to, neural network (NN) structures, tree-based classifiers, linear models and the like and/or any ML technique suitable for modelling/operating on the set of embeddings and/or an embedding vocabulary dataset generated during training of an ML model or classifier. Each set of embeddings for a separable entity of interest includes an embedding for the separable entity of interest (e.g. a specific biological entity of interest found in a portion of text) and an embeddings for one or more of any genericised and/or specificised entity(ies) associated with the separable entity of interest. Further sets of embeddings for each of one or more separable relationship entity(ies) (e.g. specific relationship entities found in a portion of text describing a relationship associated with one or more specific biological entity(ies) of interest) may be generated. Each set of embeddings for a separable relationship entity may include an embedding for the separable relationship entity and an embedding for one or more genericised and/or specificised entity(ies) associated with the separable relationship entity. A composite embedding may be formed for the portion of text based on one or more embeddings from each of the generated sets of embeddings. That is, the composite embedding may include a combination of at least one embedding from each set of embeddings for each separable entity of interest in the portion of text, and at least one embedding from each of the one or more sets of embeddings for each separable relationship entity in the portion of text.

ML technique(s) may be used to train and generate one or more trained models or classifiers having the same or a similar output objective associated with input data. ML technique(s) may comprise or represent one or more or a combination of computational methods that can be used to generate analytical models, classifiers and/or algorithms that lend themselves to solving complex problems such as, by way of example only but is not limited to, generating embeddings, prediction and analysis of complex processes and/or compounds; classification of input data in relation to one or more relationships.

Examples of ML technique(s) that may be used by the invention as described herein may include or be based on, by way of example only but is not limited to, any ML technique or algorithm/method that can be trained on a labelled and/or unlabelled datasets to generate an embedding model, ML model or classifier associated with the labelled and/or unlabelled dataset, one or more supervised ML techniques, semi-supervised ML techniques, unsupervised ML techniques, linear and/or non-linear ML techniques, ML techniques associated with classification, ML techniques associated with regression and the like and/or combinations thereof. Some examples of ML techniques may include or be based on, by way of example only but is not limited to, one or more of active learning, multitask learning, transfer learning, neural message parsing, one-shot learning, dimensionality reduction, decision tree learning, association rule learning, similarity learning, data mining algorithms/methods, artificial neural networks (NNs), deep NNs, deep learning, deep learning ANNs, inductive logic programming, support vector machines (SVMs), sparse dictionary learning, clustering, Bayesian networks, reinforcement learning, representation learning, similarity and metric learning, sparse dictionary learning, genetic algorithms, rule-based machine learning, learning classifier systems, and/or one or more combinations thereof and the like.

Some examples of supervised ML techniques may include or be based on, by way of example only but is not limited to, ANNs, DNNs, association rule learning algorithms, a priori algorithm, Eclat algorithm, case-based reasoning, Gaussian process regression, gene expression programming, group method of data handling (GMDH), inductive logic programming, instance-based learning, lazy learning, learning automata, learning vector quantization, logistic model tree, minimum message length (decision trees, decision graphs, etc.), nearest neighbour algorithm, analogical modelling, probably approximately correct learning (PAC) learning, ripple down rules, a knowledge acquisition methodology, symbolic machine learning algorithms, support vector machines, random forests, ensembles of classifiers, bootstrap aggregating (BAGGING), boosting (meta-algorithm), ordinal classification, information fuzzy networks (IFN), conditional random field, anova, quadratic classifiers, k-nearest neighbour, boosting, sprint, Bayesian networks, Naïve Bayes, hidden Markov models (HMMs), hierarchical hidden Markov model (HHMM), and any other ML technique or ML task capable of inferring a function or generating a model from labelled training data and the like.

Some examples of unsupervised ML techniques may include or be based on, by way of example only but is not limited to, expectation-maximization (EM) algorithm, vector quantization, generative topographic map, information bottleneck (IB) method and any other ML technique or ML task capable of inferring a function to describe hidden structure and/or generate a model from unlabelled data and/or by ignoring labels in labelled training datasets and the like. Some examples of semi-supervised ML techniques may include or be based on, by way of example only but is not limited to, one or more of active learning, generative models, low-density separation, graph-based methods, co-training, transduction or any other a ML technique, task, or class of supervised ML technique capable of making use of unlabelled datasets and labelled datasets for training (e.g. typically the training dataset may include a small amount of labelled training data combined with a large amount of unlabelled data and the like.

Some examples of artificial NN (ANN) ML techniques may include or be based on, by way of example only but is not limited to, one or more of artificial NNs, feedforward NNs, recursive NNs (RNNs), Convolutional NNs (CNNs), autoencoder NNs, extreme learning machines, logic learning machines, self-organizing maps, and other ANN ML technique or connectionist system/computing systems inspired by the biological neural networks that constitute animal brains and capable of learning or generating a model based on labelled and/or unlabelled datasets. Some examples of deep learning ML technique may include or be based on, byway of example only but is not limited to, one or more of deep belief networks, deep Boltzmann machines, DNNs, deep CNNs, deep RNNs, hierarchical temporal memory, deep Boltzmann machine (DBM), stacked Auto-Encoders, and/or any other ML technique capable of learning or generating a model based on learning data representations from labelled and/or unlabelled datasets.

The embeddings may be generated using an embedding ML model based on, by way of example only but is not limited to, any suitable ML technique and/or modifications thereto as described above such as, by way of example only but not limited to, neural network (NN) type structures and the like. For example, a neural network structure may be based on an "embedding lookup table/matrix" in which individual terms are mapped to their corresponding embedding vectors, where a composite embedding may be a concatenation of these individual term vectors to a larger vector. Examples of NNs or NN structures or techniques that may be used by the invention as described herein may include or be based on, by way of example only but is not limited to, at least one or more neural network structures from the group of: artificial NNs (ANNs); deep NNs; deep learning; deep learning ANNs; deep belief networks; deep Boltzmann machines, hierarchical temporal memory; rule-based machine learning; feedforward NNs; Long-Short-Term-Memory NNs (LSTM NNs); recursive NNs (RNNs); Convolutional NNs (CNNs); graph CNNs (GCNNs); graph NNs; autoencoder NNs; stacked Auto-Encoders; WaveNet type NNs; reinforcement learning (RL) algorithms and networks; extreme learning machines; logic learning machines; self-organizing maps; other ANN structures, techniques or connectionist systems/computing systems inspired by the biological neural networks that constitute animal brains and capable of learning or generating a model based on data representative of labelled and/or unlabelled training datasets; any NN or NN algorithm/method that can be trained on data representative of labelled and/or unlabelled training datasets including a plurality of training data items, each training data item including data representative of a portion of text from a corpus of text to generate an embedding of said portion of text or embedding of each component or separable entity of the portion of text; any other NN structure or technique capable of learning or generating a NN model for generating composite embeddings based on learning data representations from data representative of labelled and/or unlabelled training datasets and the like; and/or combinations thereof, modifications thereof and/or as described herein.

Although the embedding ML model and/or ML models/classifiers are described herein for simplicity, and by way of example but are not limited to, as being based on neural network structures and the like, it is to be appreciated by the skilled person that the embedding ML model and/or ML models/classifiers as described herein may be trained and/or based on any suitable one or more ML technique(s), modifications thereof, combinations thereof, and/or as the application demands.

In particular, generating the embedding may be based on training an ML technique to generate an ML model or classifier based on a labelled training dataset including a plurality of labelled training data items, each labelled training data item comprising data representative of a known portion of text (or specific sentence) with a known relationship in relation to one or more entity(ies) of interest, and generating a composite embedding of each labelled training data item. The composite embedding of each labelled training data item may be for input to the ML technique, which may improve the training of an ML model or classifier and/or the resulting trained ML model or classifier. The composite embedding for each labelled training data item allows improved training of ML models and/or for input to an ML model/classifier for use in relationship extraction and the like.

By replacing and/or merging the separable entity(ies) of interest (e.g. specific biological entity(ies)) and sentence or separable relationship entity(ies) with one or more genericised and/or specificised entity(ies) associated with the separable entity(ies) of interest and relationship entity(ies), respectively, from corresponding hierarchical data structures and the like (e.g. ontology/tagging/lists of entity associations or mappings and/or other means) allows an ML model to be trained to generalise relationships between entity(ies) of interest (e.g. diseases, proteins, and/or drug interactions) whilst also retaining knowledge of the specific relationship between the entity(ies) of interest.

For example, a specific training data instance or labelled training data item from a training dataset may be based on the sentence (or text portion):

"Alzheimer's Disease is treated by modulating LRP1"

The separable entity(ies) of interest in this portion of text include "Alzheimer's Disease" and "LRP1". The relationship in this portion of text between these two entities of interest is described by "is treated by modulating". Several separable relationship entities may be extracted and may include "is", "treated", "by", and "modulating".

In this example, the separable entities of interest (e.g. "Alzheimer's Disease", "LRP1") may be genericised by selecting one or more entity(ies) associated with the separable entity of interest that are more generic than the separable entity of interest. However, it is to be appreciated by the skilled person that the separable entities of interest may also be specificised by selecting one or more entities associated with the separable entity of interest that are more specific than the separable entity of interest.

In this example, a hierarchical disease ontology may be used to, by way of example only but not limited to, select several genericised entities associated with "Alzheimer's Disease", where "Alzheimer's Disease"→"neurodegenerative disease"→"neurological disease". The genericised entities associated with the separable entity of interest "Alzheimer's Disease" includes, by way of example only but are not limited to, "neurodegenerative disease" and "neurological disease". These may be used to give one or more generalised text portions or sentences such as, by way of example only but is not limited to:

"neurodegenerative disease is treated by modulating LRP1"

"neurological disease is treated by modulating LRP1"

Similarly, a hierarchical gene ontology may be used to genericise the separable entity of interest "LRP1" for selecting several genericised entities associated with "LRP1", where "LRP1"→"lipoprotein"→"gene". The genericised entities associated with the separable entity of interest "LRP1" includes, by way of example only but are not limited to, "lipoprotein" and "gene". These may be used to give one or more generalised text portions or sentences such as, by way of example only but is not limited to:

"neurodegenerative disease is treated by modulating genes"

"neurological disease is treated by modulating lipoproteins"

Of course, various different combinations of the separable entities of interest and the selected genericised and/or specificised entities associated with the separable entities of interest may be used to generate different genericised sentences that could be used as labelled training data for training a ML model/classifier for learning generic patterns about diseases treated by modulating LRP1 (gene).

This can be taken further by genericising and/or specificising the separable relationship entities (e.g. sentence or non-biological entities), which in this example include, by way of example only but are not limited to, "is", "treated", "by", and "modulating". For example, hierarchical data structure such as a grammar tree or syntax tree associated with the relationship "is treated by modulating" may be used to genericise each of the separable relationship entities. For example, each of the separable relationship entities may have genericised entities selected based on, by way of example only but is not limited to, "treated"→"verb", "modulating"→"verb", "is"→"conjunction" etc. This can lead to a multitude of further genericised sentences or portions of text based on the various combinations of all the separable entities and corresponding selected genericised entities associated with each separable entity. The combinations of the different portions of text may be used as labelled training data items for the above-mentioned specific training data instance/item. Embeddings may be generated for all of the separable entities (e.g. specific entities) and genericised entities associated with the separable entities in relation to the original text portion and combined to form one or more composite embeddings representing that text portion. This may be performed each time a text portion is required for input to a trained ML model or classifier, and/or for each training data item of a training dataset during training of a ML technique for generating a ML model or classifier.

By generating a composite embedding including embeddings of both separable entity of interest and relationship entity information in specific and genericised forms (e.g. using hierarchy/tagging information of entities associated with the separable entities etc.), means an ML model/classifier can leverage this information and learn how to interpret the specific, intermediate and generalised forms of entity(ies) of interest and relationships thereto. Such composite embeddings allows ML models and/or classifiers to learn generic patterns in which certain patterns may have more relevance. For example, rather than the ML model being focused on a particular entity of interest (e.g. a disease such as "Alzheimer's Disease"), the ML model can robustly handle other related entity(ies) of interest (e.g. other neurodegenerative diseases) other than the particular entity(ies) of interest and relationships that it may have been trained on; the learnt patterns become transferable across a greater range of entity(ies) of interest (e.g. all neurodegenerative diseases or diseases and the like).

Although the embedding technique according to the invention is described herein in relation to biological entities such as, by way of example only but not limited to, entity(ies) of the entity type from the group of: gene; disease; compound/drug; protein; chemical, organ, biological; or any other entity type associated with bioinformatics or chem(o)informatics and the like, this is by way of example only and the invention is not so limited, it will be appreciated and understood by the skilled person that the invention is applicable to any corpus of text or literature, any type of one or more entity(ies) of interest within the text, relationships and/or subject-matter thereto, and/or as the application demands.

FIG. 1a is a schematic diagram illustrating an example embedding system 100 for embedding one or more portions of text 108, in which each portion of text 108 describes a relationship for one or more entities of interest (or entities) according to the invention. The embedding system 100 includes an embedding module 102 coupled to an ML module 104. The embedding module 102 configured for generating a composite embedding 114 of one or more portions of text 108, in which each portion of text 108 includes data representative of one or more entity(ies) of interest and a relationship thereto, the relationship including or being defined by one or more relationship entity(ies). The entity(ies) of interest and the relationship entity(ies) may each be extracted from the portion of text and can be referred to as separable entities. Thus a portion of text may include multiple separable entities comprising one or more entity(ies) of interest and one or more relationship entity(ies).

The composite embedding 114 includes a plurality of sets of embeddings 114a-114d each corresponding to one or more separable entity(ies) 116a-116d of a text portion (e.g. specific or original entities extracted from the text portion). Each of the sets of embeddings 114a-114d further includes one or more corresponding entity(ies) 118a-118d (e.g. genericised or specificised entities) associated with the corresponding separable entity(ies) 116a-116d of the portion of text. Each portion of text 108, or data representative of the portion of text 108, may be input to the embedding module 102, which generates the composite embedding 114 of the portion of text 108 that is suitable for input to the ML module 104.

The ML module 104 may be configured as a trained ML model or classifier that has been trained to operate on a composite embedding 114 of one or more portions of text 108. A portion of text 108 may be a query or portion of text 108 for identification/relationship extraction etc., that is processed by the ML model or classifier based on the composite embedding 114. The ML model may be trained by a ML technique based on a training dataset 110 in which each training data item 112 of the training dataset 110 is passed through the embedding module with the corresponding composite embedding 114 being input to the ML module 104 for training an ML technique to generate an ML model.

The ML module 104 may also be configured for training an ML model or classifier based on one or more ML techniques using labelled training dataset 110 (e.g. X= $\{X_1 \ldots X_T\}$), which includes a plurality of labelled training data items (e.g. $X_1 \ldots X_T$), which may be labelled based on a set of labels 106 (e.g. $\mathcal{L}=\{\ell_1 \ldots \ell\}$). Each labelled data item 112 (e.g. $X_n$) includes data representative of a portion of text from a corpus or text or literature. Each labelled training data item 112 is input to the embedding module for generating a composite embedding 114 of the labelled data item 112.

Each text portion includes one or more entity(ies) of interest or entity(ies) (e.g. particular words or phrases) and a relationship regarding the one or more entities of interest. For example, an n-th portion of text may have a form "<Specific Entity>$_{n1}$<Relationship>$_n$<Specific Entity>$_{n2}$", where the entities of interest include, by way of example only but are not limited to, <Specific Entity>$_{n1}$ and <Specific Entity>$_{n2}$ and the relationship between these entities of interest is <Relationship>$_n$. Each entity of interest may be regarded as a specific entity (e.g. <Specific Entity>$_{n1}$), which may include one or more words, terms or phrases that defines that specific entity. The specific entity is a separable entity of interest. Each relationship (e.g. <Relationship>$_n$) may include one or more words, terms or phrases that defines the relationship and which form one or more separable relationship entities, (e.g. <Rel. Entities>$_{n1}$, . . . , <Rel. Entities>$_{n1}$), which define parts or entities of the relationship.

For example, in the biological field, the n-th portion of text may be: "Alzheimer's Disease is treated by modulating LRP1", in which there are two specific or separable biological entities of interest and one relationship associated with these two biological entities of interest. The first specific biological entity of interest is <Specific Entity>n1="Alzheimer's Disease" and the second biological entity is <Specific Entity>n2="LRP1". The relationship associated with the first and second biological entities of interest is <Relationship>n="is treated by modulating". The relationship is formed by four separable relationship entities, namely, <Rel. Entities>n1="is"; <Rel. Entities>n2="treated"; <Rel. Entities>n3="by"; <Rel. Entities>n4="modulating". Thus, the n-th portion of text includes multiple separable entities including one or more specific biological entity(ies) (e.g. <Specific Entity>n1="Alzheimer's Disease" and <Specific Entity>n2="LRP1") and a relationship associated with the one or more specific biological entity(ies), the relationship including one or more relationship entity(ies) (e.g. <Specific Rel. Entities>n1="is"; <Specific Rel. Entities>n2="treated"; <Specific Rel. Entities>n3="by"; <Specific Rel. Entities>n4="modulating"). In another example, for a protein expressed from a gene can activate the transcription of the latter, the gene and its protein product may be treated as being identical (e.g. gene or protein) in which case, a relationship of one entity with itself may result. Thus a single specific or separable biological entity (e.g. <Specific Entity>=gene/protein) and the relationship associated with the specific or separable biological entity (e.g. <Relationship>) may result. Many transcription factor genes can fall into this class, or one or more proteins bind to themselves, resulting in self-relations. Thus, an n-th portion of text may include one or more specific or separable biological entity(ies) and one or more separable relationship entities associated with the relationship of the one or more specific or separable biological entity(ies). Although the separable entities are described herein, by way of example only but is not limited to, as being represented by text strings, it is to be appreciated by the skilled person that each separable entity may be based on data representative of strings, symbols, values vectors, or any other type of data for uniquely representing each separable entity.

As an example, each separable entity may be a string or symbol and the like that may be mapped to a unique identifier for that separable entity. For example, if two text strings associated with one or more separable entity(ies) are determined to be identical, e.g. taking into account different spellings such as, by way of example only but not limited to, American/British spellings, then these separable entity(ies) are mapped to the same unique identifier(s), symbol(s), or string(s) and the like. Should two or more strings associated with separable entities are determined to be not-identical, e.g. taking into account different spellings such as, by way of example only but not limited to, American/British spellings, then each of these separable entities may be mapped to different unique identifier(s), symbol(s), or string(s) and the like as they correspond to different separable entities. modulating").

The embedding module 102 thus receives a text portion comprising data representative of one or more separable entities of interest 112a-112b and one or more separable relationship entity(ies) 112c-112d. For example, each separable entity 112a-112d may be represented as a unique identifier, symbol or string. The embedding module 102 may include an embedding model that is configured to process the input separable entities 112a-112b and 112c-112d to generate a composite embedding of the text portion. The embedding model may be based on, by way of example only but is not limited to, one or more from the group of a neural network structure; a feedforward neural network (FNN); a recursive neural network (RNN); LSTM neural network structure; a convolutional neural network (CNN); WaveNet type neural network; an autoencoder based neural network; any neural network structure capable of generating a latent space from data representative of a plurality of text portions; any neural network structure capable of embedding a text portion into a composite embedding 114 with a structure as described herein.

The embedding model may be iteratively trained to generate an embedding of each of the multiple separable entities for each training data item in a training dataset and/or a composite embedding of each training data item in a training dataset, whilst at the same time the ML module 104 iteratively trains one or more ML models and/or classifiers based on the composite embeddings generated by the embedding model. In each iteration, the ML module 104 feeds back output results (e.g. label estimates etc.) from the ML model and/or classifiers to the embedding module 102 via a feedback loop 119. This allows the embedding module 102 to receive results output from the ML model or classifiers on each training dataset iteration and to enable the embedding module 102 to update the embedding model accordingly for the next training iteration. The composite embeddings are learnt by the embedding model of the embedding module 102 during training of the ML model and/or classifier 104.

In order to produce a composite embedding 114, the embedding module 102 analyses each of the separable entities 112a-112d of the text portion 108 or training data item 112 and generates one or more entities associated with each of the separable entities 112a-112d. For example, each of the separable entity(ies) 112a-112d may be associated or part of one or more hierarchy graphs or trees with one or more genericised, specificised or hierarchical entity(ies) being associated with the separable entity(ies). Thus, embedding module 102 may select the corresponding entity(ies) associated with each separable entity by parsing or querying an entity data structure such as, by way of example only but not limited to, parsing a hierarchical tree or graph starting from the position in the tree or graph represented by the separable entity and selecting one or more genericised entity(ies) associated with the separable entity by parsing up the tree towards the root node and/or selecting one or more specificised entity(ies) associated with the separable entity by parsing down the tree towards the leaf nodes of the hierarchical graph.

For example, in biological literature, separable biological entities (e.g. disease, gene, proteins and the like) may be part of a hierarchical based tree or graph structure based on, by way of example only, one or more biological entity ontologies, a disease ontology, gene ontology, protein-protein graph or ontology, protein-gene interaction graph, or any other hierarchical or biological tagging system or data structure and the like. For relationship entities, given most relationships are composed of sentence entities or non-biological entity words and/or phrases, an example of a relationship hierarchical tree may be based on, by way of example only but not limited to, a syntax or grammar tree, a vocabulary of words, synonyms, or phrases generated by analysing a plurality of relationships from a plurality of text portions or a training dataset.

The embedding module 102 processes data representative of the text portion 108, 112 including one or more separable entities of interest and corresponding one or more entities associated with the separable entities of interest, one or more separable relationship entities and corresponding one or more relationship entities associated with the separable relationship entities etc., and generates a corresponding composite embedding 114 that includes one or more sets of embeddings 114a-114b associated with the one or more entity(ies) of interest (or specific entity(ies)) 112a-112b and one or more sets of embeddings 114c-114d associated with the one or more relationship entity(ies) 112c-112d. The embedding module 102 may generate a set of embeddings 114a-114d for each of the multiple separable entities 112a-112d, where each set of embeddings 114a-114d includes an embedding of the corresponding separable entity 116a-116d and at least one embedding of an entity 118a-118d associated with the corresponding separable entity 112a-112d. One or more composite embeddings 114 may be formed based on at least one embedding 116a-118d from each of the sets of embeddings 114a-114d. Each composite embedding 114 may be sent for input to the ML module 104 for use with a ML technique, ML model and/or classifier and the like.

Figure 1B:
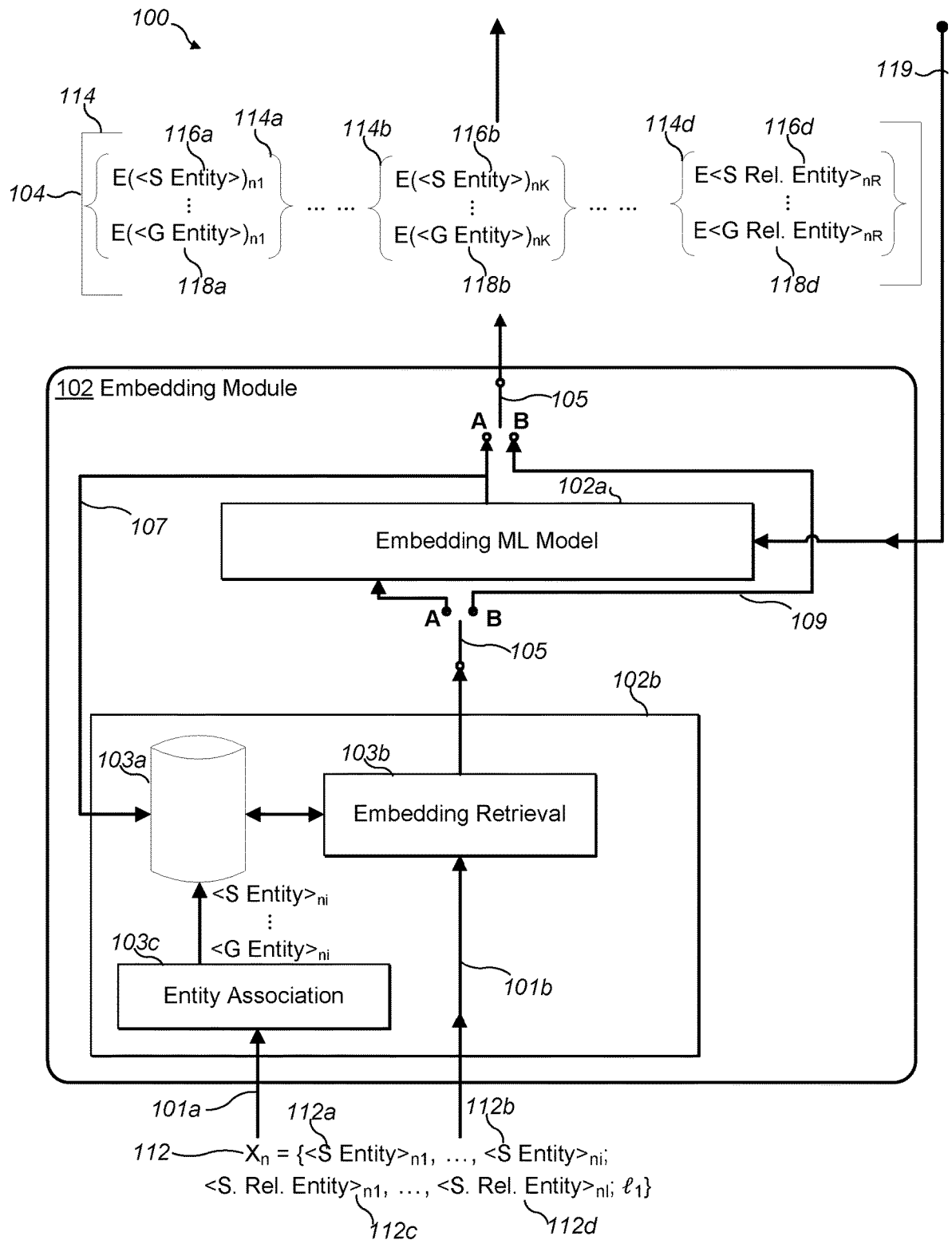
FIG. 1b is a schematic diagram illustrating an example embedding module for the example embedding system of FIG. 1a according to the present disclosure.

FIG. 1b is a schematic diagram illustrating an example embedding module 102 for the example embedding system 100 of FIG. 1a. The embedding module 102 includes an entity-embedding analysis unit 102b coupled to an embedding model 102a. The entity-embedding analysis unit 102b may include an embedding vocabulary dataset 103a, an entity association unit 103c and an embedding retrieval/generating unit 103b. The embedding module 102 is configured to receive data representative of a portion of text or a query. The portion of text or query may include data representative of a relationship for one or more entity(ies) of interest 112a-112b. In this example, the portion of text includes multiple separable entities 112a-112d including one or more relationship entity(ies) 112c-112d and the one or more entity(ies) of interest 112a-112b. The portion of text may be training data item 112 and/or, after training, a query (not shown). The training data item 112 includes data representative of the multiple separable entities 112a-112d, which includes one or more entity(ies) of interest 112a-112b and one or more relationship entity(ies) 112c-112d. Each separable entity may be represented, by way of example only but is not limited to, a unique string or symbol or other data for representing each separable entity.

In operation, the embedding module 102 generates, for each received text portion (e.g. training data item and/or query), a set of embeddings for each of the multiple separable entities 114a-114d of the text portion. Each set of embeddings 114a-114d associated with a separable entity 112a-112d includes an embedding of the corresponding separable entity 116a-116d and at least one embedding of an entity 118a-118d associated with the corresponding separable entity 116a-116d. The embedding module 102 sends at least one embedding from each of the sets of embeddings 114a-114d for input to a ML module 104 of FIG. 1a, which may include a ML technique for training a ML model or classifier, and/or trained ML model or classifier for operating on the input embeddings.

In order to perform these operations, the embedding module 102 and entity-embedding analysis unit 102b may be configured to iteratively train the embedding model 102a, whilst the corresponding ML model or classifier is being trained, to generate the embeddings for each set of embeddings 114a-114d associated with a separable entity 112a-112d. For example, both the embedding model 102a of the embedding module 102 and the downstream ML model/classifier may be trained "end-to-end", i.e. together with a single objective to be optimised against (e.g. when path 105 connects to point A). Feedback may be provided via path 119 from the ML model for updating the embedding model 102a. Alternatively, in another example, the embedding model 102a of the embedding module 102 may be trained separately from the downstream ML model/classifier, which may be trained at a later time once the embedding model 102a has been validly trained to output suitable embeddings. The output of the embedding model 102a may be connected to the feedback path 119 for use in training the embedding model 102a against a training dataset.

The entity-embedding analysis unit 102b includes a training mode (e.g. when path 105 connects via point A) of operation and a direct mode (e.g. when path 105 connects via point B) of operation. In the training mode of operation, entity-embedding analysis unit 102b is configured to train the embedding model 102a, where the path 105 connects via point A. In the direct mode of operation, the entity-embedding analysis unit 102b is configured to bypass the embedding model 102a, where the path 105 connects via point B, and uses embeddings extracted from the embedding model 102a and stored as an embedding vocabulary dataset 103a during training of the embedding model 102a and/or the ML classifier/model. The embedding vocabulary dataset 103 includes data representative of one or more entity(ies) mapped to one or more corresponding embeddings, which were generated by the embedding model 102a.

Initially, the embedding model 102*a* and/or the ML model/classifier of the ML module 104 of FIG. 1*a* may be trained based on a labelled training dataset including a plurality of labelled training data items generated from a corpus of text. Each labelled training data item 112 may include data representative of one or more entities of interest 112*a*-112*b* and one or more relationship entities 112*c*-112*d* associated with a label for training an ML model or classifier. An entity association module 103*c* may receive via input 101*a* the labelled training dataset and generate a corpus of entities comprising a plurality of unique separable entities and entities associated with each unique separable entity for the embedding vocabulary dataset 103*a*.

For example, each training data item 112 of the training dataset includes data representative of multiple separable entities 112*a*-112*d* associated with a portion of text, which includes one or more entity(ies) of interest 112*a*-112*b* and one or more relationship entity(ies) 112*c*-112*d*. The separable entities 112*a*-112*d* are extracted and used to build an entity vocabulary containing a unique set of separable entities. During extraction, each separable entity of interest 112*a*-112*b* and/or separable relationship entity 112*c*-112*d* may be used to generate and select one or more genericised or specificised entities associated with the separable entity 112*a*-112*d* using entity association data structures such as, by way of example only but not limited to, hierarchical trees or graphs, ontologies, grammar and/or syntax trees and the like. For example, each separable entity 112*a*-112*d* may be extracted. From each extracted separable entity 112*a*-112*d*, one or more entity association data structures (e.g. hierarchical tree/graph or ontology and the like) may be used to select one or more genericised and/or specificised entity(ies) associated with the separable entity. Data representative of all unique occurrences of each separable entity and associated entity(ies) may be stored in the entity embedding vocabulary dataset 103*a*.

The entity embedding vocabulary dataset 103 that stores each separable entity also links the separable entities to one or more entities associated with that separable entity. As well, each separable entity and each of the associated other entities are also mapped to an initial embedding such as, by way of example only but not limited to, a random embedding or an embedding derived from a previous training iteration and the like. Each separable entity and associated entities may be stored as symbol data in a table or other suitable data structure. Similarly, each embedding of a separable entity and/or entity associated with a separable entity may be stored in the form a vector and/or matrix and the like.

Once the entity embedding vocabulary dataset 103*a* is built and initialised, the embedding module 102 and ML module 104 may begin training based on the labelled training dataset. It is noted, that path 105 connects to point A during training, thus the embeddings associated with each labelled training data item 112 are input to the embedding ML model 102*a*. The entity embedding analysis unit 102*b* receives each training data item 112 via input 101*b*. Embedding retrieval unit 103*b* uses the separable embeddings of the training data item 112 to retrieve the embeddings 116*a*-116*d* of each separable entity 112*a*-112*d* that are stored in the entity embedding vocabulary dataset 103*a*. As well, for each separable entity 112*a*-112*d*, the embeddings of entities 118*a*-118*d* associated with the corresponding separable entity 112*a*-112*d* are also retrieved (e.g. the linking/mapping information is previously stored in the embedding vocabulary dataset). These are input to the embedding ML model 102*a*, which generates further updated embeddings for each of the separable entities and also entities associated with the separable entities based on output 119 received from the ML model during a previous training iteration. The updated embeddings may be used to form a composite embedding 114 comprising at least one embedding from each of the sets of embeddings 114*a*-114*d* associated with each separable entity 112*a*-112*d*.

In the example of FIG. 1*b*, the composite embedding 114 associated with the training data item 112 is shown to include all of the sets of embeddings 114*a*-114*d* associated with each of the separable entities 112*a*-112*d*. However, it is to be appreciated by the skilled person, that one or more composite embeddings associated with the training data item 112 may be formed based at least on one embedding from each of the sets of embeddings associated with each separable entity 112*a*-112*d*. Each of the composite embeddings 114 may be input to the ML module 104 of FIG. 1*a* for use in training an ML technique to generate an ML model or classifier. The output of the ML model or classifier may be fed back along feedback path 119 to the embedding module 102, which is used by the embedding ML model 102*a* for updating the embedding ML model 102*a* for generating more suitable embeddings for the separable entities and associated entities for each training data item 112 of the training data set. The updated embeddings for each separable entity and also each entity associated with the separable entity generated by the embedding ML model 102*a* may be extracted and fed back, via embedding feedback path 107, for updating the embeddings of the corresponding separable entities and/or entities associated with the separable entities. Thus, the embeddings of the entity embedding vocabulary dataset are updated in each iteration of the training of the embedding ML model 102*a* and/or the training of the ML model or classifier of the ML module 104. Once the embedding ML model 102*a* and/or the ML model or classifier of the ML module 104 are considered to be trained, or validly trained. For example, an indication of valid training may be triggered when, by way of example only, one or more from the group occurs: an error vector associated with the output of the ML model or classifier may be below an error threshold for all labelled training data items of the training data set; a maximum number of training iterations have been performed; and/or any other measure or analysis determining the embedding ML model and/or ML model or classifier have been validly trained.

Once the embedding ML model 102*a* has been validly trained, this means that all embeddings of the entities stored in the entity embedding vocabulary dataset 103*a* may now be used directly to generate queries and the like for input to the trained ML model and/or classifier. The embedding module 102 may then bypass the embedding ML model 102*a* because the embeddings that the embedding ML model 102*a* has learnt are extracted and stored in the entity embedding vocabulary dataset 103*a* during training. Thus, the path 105 may change from training mode (e.g. "A") to direct mode (e.g. "B") in which path 105 connects to point B. Furthermore, the embedding retrieval unit 103*b* may be configured to process the received separable entities from a query associated with a portion of text, which may include one or more separable entities and/or one or more relationship entities to generate the composite embedding 114 of that query using the entity embedding vocabulary dataset 103*a*.

For example, a query may include data representative of one or more entities of interest and one or more relationship entities for inputting to a trained ML model or classifier. The entity-embedding analysis unit 102*b* may use the entity embedding retrieval unit 103b to retrieve, from the entity embedding vocabulary dataset 103a, the sets of embeddings of each separable entity of the query, which include embeddings of entities associated with each separable entity. Thus, the entity-embedding analysis unit 102b may input at least one embedding from each of the sets of embeddings to an ML model or classifier trained for predicting whether there is evidence supporting the relationship of the portion of text.

If a separable entity associated with a query does not exist in the entity embedding vocabulary dataset 103a, then the entity retrieval unit 103b may be configured to use the entity association unit 103c (or similar functionality) to genericise and/or specificise the separable entity to generate one or more entities associated with the separable entity. For example, the separable entity may be "Parkinson's Disease", which was not seen during training, thus this separable entity will not be included in the entity embedding vocabulary dataset 103a. The entity association unit 103c may parse the disease ontology to generate one or more genericised and/or specificised entities associated with "Parkinson's Disease". The entity association unit 103c may recognise that "Parkinson's Disease" is in a similar level of the disease ontology as "Alzheimer's Disease", which was seen during training. Thus, the entity association unit 103c may select several genericised entities associated with "Parkinson's Disease", where "Parkinson's Disease"→"neurodegenerative disease"→"neurological disease". Furthermore, should the entity association unit 103c determine a more specific form of "Parkinson's Disease" was seen during training, then this may be used as a specificised entity associated with "Parkinson's Disease". Given, the entities "neurodegenerative disease" and "neurological disease" and, perhaps, the more specific form of "Parkinson's Disease" may have been seen during training, then the embeddings associated with these entities will be already stored in the entity embedding vocabulary dataset 103a. Thus, the entity association unit 103c (or its functionality) may be used by the entity embedding retrieval unit to retrieve those entities associated with the separable entity that exist in the entity embedding vocabulary dataset 103a.

The entity retrieval unit 103b may then generate a set of embeddings for the separable entity based on any embeddings of entities associated with the separable entity that exist in the entity embedding vocabulary dataset 103a and use an out-of-vocabulary embedding for those entities and also the separable entity that do not exist in the entity embedding vocabulary dataset 103a. A composite embedding may then be formed based on one or more embeddings from each of the sets of embeddings of each separable entity associated with the query. Alternatively or additionally, an embedding based on the separable entity that is found not to exist in the entity embedding vocabulary dataset 103a may be generated using the trained embedding ML model 102a.

The entity retrieval unit 103b may be configured to generate any query, which is essentially a portion of text including one or more separable entity(ies) of interest and/or one or more separable relationship entity(ies), and use the entity association unit 103c and the entity embedding vocabulary dataset 103a to form a composite embedding based on the sets of embeddings for the portions of text, and input the composite embedding to a ML model or classifier trained for predicting whether there is evidence supporting the entity relationship of the portion of text. This may be used for relationship extraction, in which each portion of text from a plurality of portions of text, each portion of text describing a relationship associated with one or more entities of interest may be input as a composite embedding to a ML model or classifier trained for predicting whether there is evidence supporting the relationship associated with the one or more entities of interest of each portion of text. As the portion of text may include one or more unknown entity(ies) of interest (e.g. entities of interest not seen during training) associated with one or more relationship entity(ies) of a relationship, the entity retrieval unit 103b may generate composite embeddings as described using output vocabulary embeddings for those unknown entities of interest. Similarly, the portion of text may include one or more unknown entity(ies) of interest (e.g. entities of interest not seen during training) associated with one or more unknown relationship entity(ies) of a relationship, the entity retrieval unit 103b may generate composite embeddings as described using output vocabulary embeddings, genericised and/or specificised entities associated with the separable entities for those unknown entities.

The ML model may be used in relationship extraction for identifying a particular relationship for one or more entities of interest. The entity embedding retrieval unit 103b may be configured, as described, to form a composite embedding based on the sets of embeddings for each of a plurality of portions of text describing the one or more entities of interest, and input each composite embedding to the ML model or classifier trained for identifying a particular relationship for one or more entity(ies) of interest, the ML model or classifier may be configured to output evidence for each of the plurality of portions of text exhibiting the particular relationship.

In particular, the entity-embedding retrieval unit 103b may be configured to generate the set of embeddings for a each of the multiple separable entities of a received portion of text by retrieving, from the embedding vocabulary dataset 103a, one or more embedding(s) of entities associated with separable entity of said separable entity from the embedding vocabulary dataset 103a. The entity-embedding retrieval unit 103a is configured to form, for each separable entity of the received portion of text, a set of embeddings associated with said separable entity based on the retrieved one or more embeddings elements.

In the situation that an embedding for a separable entity does not exist in the entity embedding vocabulary dataset 103a, the entity embedding retrieval unit 103b is configured to: determine whether an embedding corresponding to each of the separable entity and one or more entity(ies) associated with the separable entity exists in the embedding vocabulary dataset for said separable entity. Those embeddings associated with the separable entity elements that exist in the embedding vocabulary dataset 103a for said separable entity are retrieved. However, out-of-vocabulary embeddings are generated for those embeddings associated with the separable entity that is not found in the embedding vocabulary dataset 103a for said separable entity. The entity embedding retrieval unit 103b generates a set of embeddings for said separable entity based on at least one of any retrieved embedding(s) and any generated out-of-vocabulary embedding(s).

Each of the sets of embeddings 114a-114b associated with a separable entity of interest 112a or 112b includes data representative of an embedding of the separable entity 116a or 116b (e.g. an embedding element E(<Specific Entity>$_{n1}$) or an embedding element E(<Specific Entity>$_{nK}$)) and an embedding of at least one entity 118a or 118b associated with the separable entity of interest 112a or 112b (e.g. subsequent embedding elements E(<Generic Entity>$_{n1}$) or E(<Generic Entity>$_{nK}$)). Each of the sets of embeddings 114a-114b associated with the separable relationship entities 114a-114b includes an embedding element of a specific relationship entity 116c (e.g. E(<Specific Relationship Entity>$_{n1}$)) and one or more subsequent embedding elements of hierarchical relationship entity(ies) 118c (e.g. E(<Generic Relationship Entity>$_{n1}$)) associated with the specific relationship entity 112c.

The composite embedding 114 may be input to the ML module 104 when training an ML model, which means that the ML model will receive data representative of a plurality of embeddings associated with specific entities and one or more hierarchical entities associated with the specific entity. This also means that the ML model is trained on all of the possible combinations of specific embeddings and/or selected hierarchical embeddings associated with the specific embeddings. Thus, the ML model may learn during training both specific and generic patterns and nuances formed from any combination of: the one or more specific entities; the one or more hierarchical entities associated with the specific entities; one or more specific relationship entities; and one or more hierarchical relationship entities; associated with each portion of text represented by the training dataset 110.

The embedding system 100, embedding module 102, and/or ML module 104 may be configured to implement any of the methods and/or process(es), apparatus and/or systems in relation to generating a composite embedding for input to a ML model or classifier as described with reference to FIGS. 1a-4b, modifications thereof, and/or as herein described.

Figure 1C:
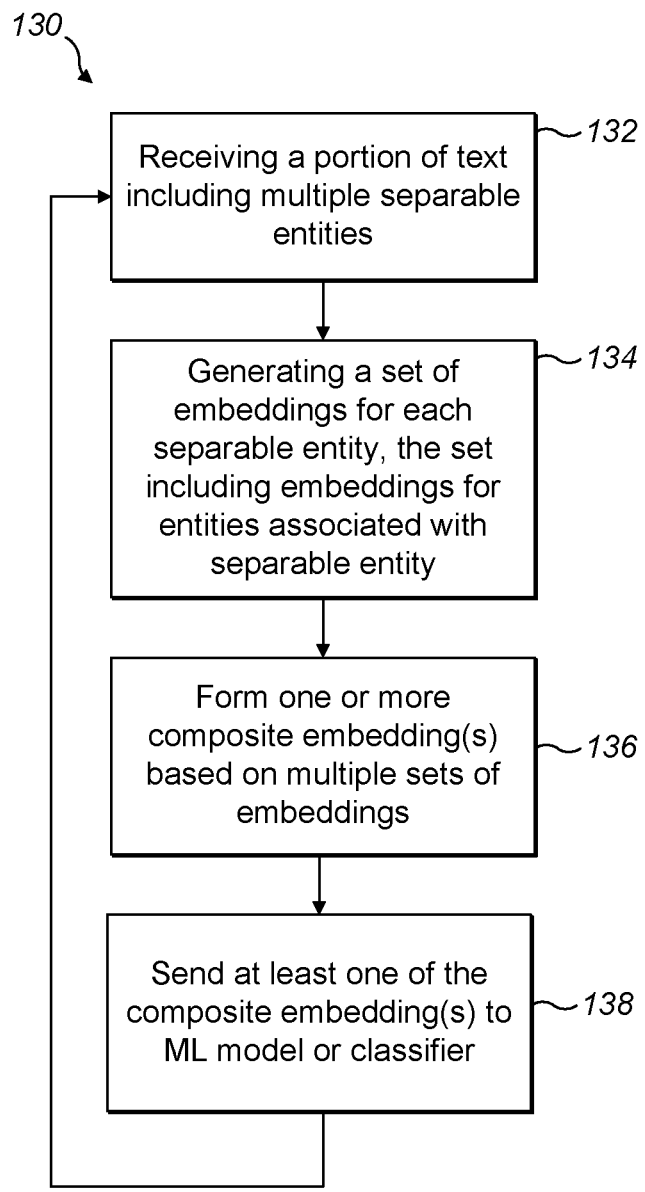
FIG. 1c is a flow diagram illustrating an example method for embedding a portion of text according to the present disclosure.

FIG. 1c is a flow diagram illustrating an example method 130 for embedding a portion of text describing a relationship for one or more entities of interest (e.g. biological entities). The method may be performed by the embedding module 102, which may include a processor, communications interface, and memory or storage, the processor connected to the communications interface, memory or storage. The processor may be configured to perform the method 130. In this example, the method 130 is described with, byway of example only but is not limited to, reference to one or more entity(ies) of interest and a corresponding relationship thereto. Although the method 130 and examples herein may be described with reference to bioinformatics, chem(o) informatics, biological entity(ies) (or entities of interest) and relationships thereto, it is to be appreciated by the person skilled in the art that the entity of interest as described herein may replace by any entity of interest in any field that generates a corpus of text from which one or more entity(ies) of interest and relationships thereto may be extracted, used for training and/or querying ML models or classifiers and the like, or as the application demands. The method 130 for embedding a portion of text includes one or more of the following steps of:

In step 132, receiving a portion of text 108 including data representative of a relationship for the one or more entity(ies) of interest (e.g. biological entity(ies)), where the portion of text 108 includes multiple separable entities 112a-112d, the multiple separable entities 112a-112d including one or more relationship entity(ies) 112c-112d and the one or more entity(ies) of interest 112a-112b (e.g. biological entity(ies)). The original portion of text may be pre-processed to extract the one or more relationship entity(ies) 112c-112d and the one or more entity(ies) of interest 112a-112b (e.g. biological entity(ies)). The portion of text 108 may be part of a training dataset 110 including a plurality of training data items, in which each training data item 112 includes data representative of the multiple separable entity(ies) 112a-112d of a corresponding portion of text, which may be extracted from a corpus of text or literature and the like.

In step 134, a set of embeddings 114a-114d for each of the multiple separable entities 112a-112d may be generated, derived or extracted based on the received portion of text 108 or training data item 112. For example, the set of embeddings 114a-114d may be retrieved from a previously generated embedding vocabulary dataset in relation to an embedding ML model 102b that was trained in conjunction with a corresponding a trained ML model or classifier. The embedding vocabulary dataset 103a may be used by the embedding module 102 to look up and retrieve each embedding 116a-118d of each of the sets of embeddings 114a-114d, or place out-of-vocabulary embeddings in each set of embeddings if not found in the embedding vocabulary dataset 103a. Each set of embeddings 116a-116d includes multiple embeddings 116a-118a, which includes the embedding of the separable entity of interest 116a and one or more embeddings of entity(ies) 118a associated with the separable entity of interest 112a. Each embedding of a set of embeddings associated with a separable entity may be generated separately or jointly depending on the configuration of the embedding ML model 102b.

For example, in order to generate a set of embeddings, the generating step 134 of the method 130 that may be implemented by the embedding module 102 may further include generating an embedding vocabulary dataset 103a by training an embedding ML model 102b based on a labelled training dataset 110 representative of a plurality of portions of text, the labelled training dataset 110 including a plurality of labelled training data items, each labelled training data item 112 corresponding to each of the plurality of portions of text and comprising data representative of multiple separable entities 112a-112d including the one or more relationship entity(ies) 112c-112d and the one or more entity(ies) of interest 112a-112b associated with the portion of text. The entity(ies) of interest 112a-112b having a relationship described by the one or more relationship entity(ies) 112c-112d. The embedding ML model 102b may be based on at least one or more ML techniques from the group of: feedforward neural network(s) (FNN); recursive neural network(s) (RNN); convolutional neural network(s) (CNN); autoencoder neural network(s); any one or more neural network structure(s) based on tensor factorization; any one or more neural network structure(s) based on projecting data representative of entity(ies) into a latent vector space; any modifications thereto; any combination(s) thereto; and/or as herein described; and/or any one or more neural network structures capable of embedding data or suitable for the embedding ML model as the application demands.

In step 136, a composite embedding 114 may be formed or read from generation step 134 of the embedding module for the received portion of text 108 or data item 112. The composite embedding 114 includes a combination of at least one embedding from each of the multiple sets of embeddings 114a-114d associated with the received portion of text 108 or data item 112. One or more composite embeddings may be generated from the multiple sets of embeddings 114a-114d associated with the received portion of text 108 or data item 112. In step 138, a generated composite embedding 114 of the portion of text 108 or data item 112 is sent to the ML module 104 for input to a ML model or classifier. The ML model or classifier may be being trained by an ML technique based on a training dataset 110 in relation to the portion of text 108 or data item 112. The ML model or classifier may already be trained based on previous composite embeddings and so, the composite embedding 114 that is generated/formed by the embedding module 102 is part of a query or input to the trained ML model or classifier, which may output a result according to the input composite embedding 114.

For example, the portion of text 108 may be part of at least one from the group of: a labelled training data item 112 that includes, by way of example only but is not limited to, one or more entities of interest and one or more relationship entities that are associated with a label of a se of labels 106 for training an ML model or classifier; and a query or data input including one or more entities of interest and one or more relationship entities for inputting to a trained ML model or classifier, which will output a result accordingly.

In another example, for multiple separable entities based on biological literature/text portions, the multiple separable entities include one or more relationship entity(ies) with one or more biological entity(ies) associated with a portion of text. Step 134 may further include generating a set of embeddings for each of the one or more biological entity(ies) of interest, where each set of embeddings includes a specific biological embedding element and one or more further biological embedding element(s). The specific biological embedding element corresponding the embedding of one of the biological entity(ies) of interest and each further biological embedding element corresponding to an embedding of one or more entities associated with the said one of the biological entity(ies) of interest. These further entities associated with the biological entity may be generated by parsing a hierarchical tree or graph or other entity association data structure associated with the biological entity. Step 134 may also include generating a set of relationship embeddings for each of the one or more relationship entity(ies), wherein each set of relationship embeddings comprises a specific separable relationship element and one or more further relationship embedding element(s), the specific separable relationship element corresponding to an embedding of one of the separable relationship entity(ies), and each further relationship embedding element corresponding to the embedding of an entity associated with said one of the separable relationship entity(ies). Step 136 may further include forming a composite embedding for the received portion of text further comprises concatenating or combining at least one embedding from each of the one or more set(s) of biological embeddings and the one or more set(s) of relationship embeddings.

Figure 1D:
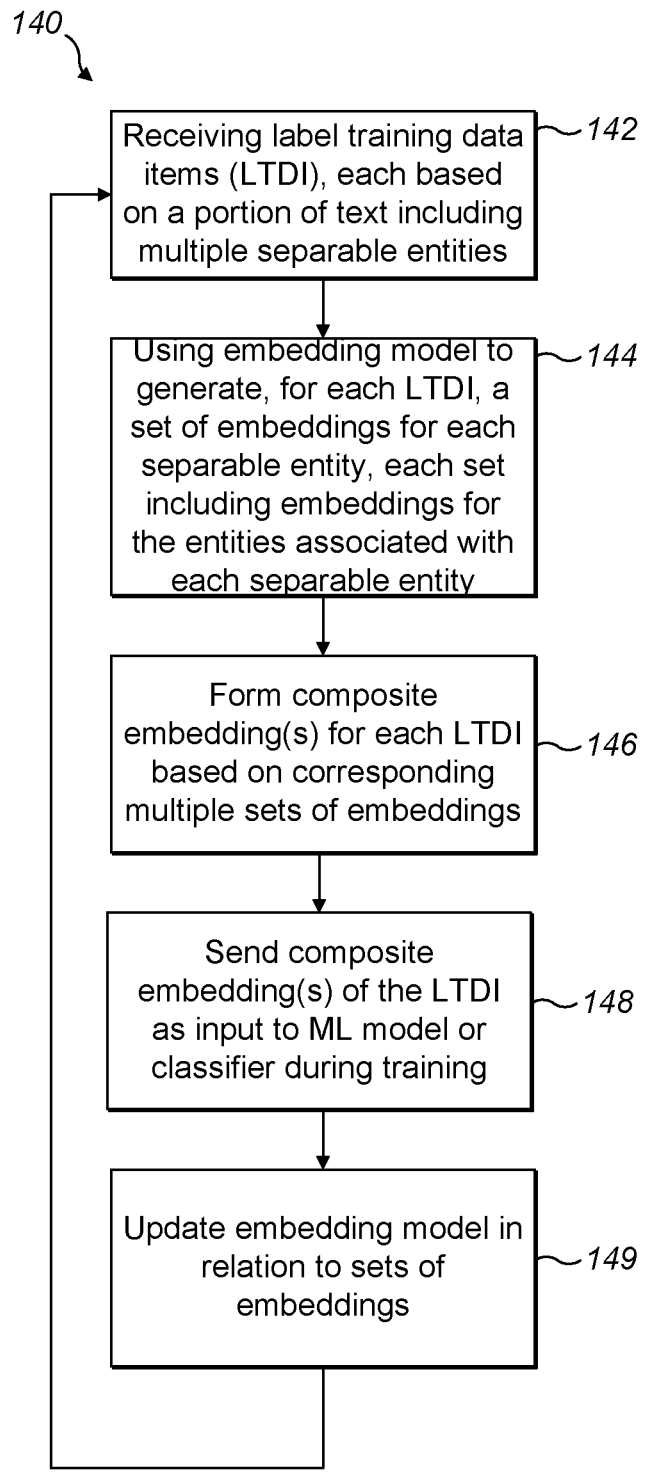
FIG. 1d is a flow diagram illustrating a method for training an embedding model for generating a set of embeddings for storage in an embedding vocabulary dataset according to the present disclosure.

FIG. 1d is a flow diagram illustrating an example method 140 for training an embedding model for generating a set of embeddings for storage of an embedding vocabulary dataset 103a. Method 140 may be performed in conjunction with the generation step 134 and/or composite embedding step 136 of method 130, or is performed prior to these steps 134 or 136. The embedding module 102 may include one or more ML techniques for generating or training one or more embedding models for generating sets of embeddings and/or embedding elements associated with entities for storage in an embedding vocabulary dataset 103a, which may be used for generating sets of embeddings from multiple separable entity(ies) in relation to one or more portions of text that may be subsequently received after the embedding vocabulary dataset has been generated. The method 140 is an iterative method and requires feedback 119 from the ML module 104, which trains a corresponding ML model or classifier based on the output composite embeddings from the embedding module 102 at the same time the embedding ML model is trained. The method 140 may include one or more of the following steps of:

In step 142, the embedding module 102 may receive a labelled training dataset 110 representative of a plurality of portions of text that have been curated and labelled accordingly (e.g. each one or more entity(ies) and relationships thereto contained in each portion of text may be labelled as being true (e.g. "1") or false (e.g. "0"), known or unknown etc.). The labelled training dataset 110 includes a plurality of labelled training data items, each labelled training data item 112 including data representative of each of the plurality of portions of text. Each labelled training data item (LTDI) 112 includes data representative of multiple separable entities 112a-112d extracted from the corresponding portion of text. The multiple separable entities 112a-112d including the one or more relationship entity(ies) 112c-112d and the one or more entity(ies) of interest 112a-112b associated with the portion of text. The entity(ies) of interest 112a-112b having a relationship described or defined by the one or more relationship entity(ies) 112c-112d.

In step 144, an embedding ML model is trained and used to generate, for each LTDI 112, a set of embeddings for each of the multiple separable entities, in which each set of embeddings includes the embedding of the separable entity of interest and an embedding of one or more entity(ies) associated with the separable entity of interest. For example, each set of embeddings may include embedding elements for the entities of interest and one or more genericised and/or specificised entities associated with the corresponding entity of interest. For example, the embedding ML model may be based on at least one or more ML techniques from the group of: feedforward neural network(s) (FNN); recursive neural network(s) (RNN); LSTM neural network structures; convolutional neural network(s) (CNN); autoencoder neural network(s); any one or more neural network structure(s) based on tensor factorization; any one or more neural network structure(s) based on projecting data representative of entity(ies) into a latent vector space; any modifications thereto; any combination(s) thereto; and/or as herein described; and/or any one or more neural network structures capable of embedding data or suitable for the embedding ML model as the application demands. For example, neural networks may be trained to generate a latent space describing the input training data, in which a latent vector corresponding to each data item may be read or extracted from the latent space. This may be used to generate the embedding elements for storage in an embedding vocabulary dataset 103a.

Furthermore, any suitable ML technique may be used to train a ML model or classifier as the application demands. For example, the ML model or classifier may be trained to be configured for predicting whether relationship exists for one or more biological entities, where the ML model or classifier is based on at least one or more ML techniques from the group of: FFN(s), RNN(s), CNN(s), autoencoder neural network(s); any one or more neural network structure(s) based on tensor factorization; any one or more neural network structure(s) based on projecting data representative of entity(ies) into a latent vector space; and/or any one or more neural network structures suitable for the corresponding ML model or classifier as the application demands. Although the embedding model and/or ML model or classifier have been described as being based on neural network ML techniques, this is by way of example only and the invention is not so limited, it is to be appreciated by the skilled person that any suitable ML technique may be used for training an embedding model for generating suitable embeddings that may form composite embeddings and/or training a suitable ML model or classifier for receiving a composite embedding as input.

In step 146, the embedding module 102 forms a composite embedding for each LTDI 112 in a similar manner as described herein based on the corresponding multiple sets of embeddings that may be generated by the embedding model during training. One or more composite embeddings may be formed or generated based on the sets of embeddings associated with each LTDI 112. For example, a composite embedding 114 may be formed by combining all the sets of embeddings 114a-114d associated with the LTDI 112. In another example, one or more composite embeddings may be formed by combining at least one embedding from each of the sets of embeddings 114a-114d associated with the LTDI 112. In step 148, each composite embedding corresponding to each LTDI is sent to the ML module 104 for input to the ML model or classifier during training. The ML model or classifier outputs one or more results, which are fed back to the embedding module 102 to enable update of the embedding model 102a. The ML model or classifier are also updated by the ML module 102 accordingly. In step 149, the embedding module 102 receives feedback results from the ML module 102 and the ML technique of the embedding module 102 updates the embedding ML model 102a in relation to the sets of embeddings. The method 140 may be repeated until it is determined that the embedding model 102a and/or the ML model or classifier have been validly trained.

Once the embedding ML model has been trained, the set of embeddings and/or all of the embedding elements in relation to all of the training data items used to train the embedding model 102b and/or ML model/classifier may be retrieved from the embedding model to generate an embedding vocabulary dataset. Alternatively or additionally, after each training iteration of the embedding model 102a, the embeddings in relation to all of the separable entities of the training data items and also the genericised/specificised entities associated with the separable entities are extracted and stored as the embedding vocabulary dataset 103a. The embedding vocabulary dataset 103a may then be used by the embedding module 102 to look up and retrieve each embedding element 116a-118d of each of the sets of embeddings 114a-114d, or place out-of-vocabulary embedding elements in each set of embeddings if not found in the embedding vocabulary dataset. Each set of embeddings 116a-116d includes multiple embedding elements 116a-118a, where a specific embedding element 116a of the multiple embedding elements 116a-118a corresponds to an embedding of a specific separable entity 112a of said each multiple separable entity(ies) 112a-112d, and each subsequent embedding element 118a represents an embedding of an entity or generic/specificised entity associated with the specific separable entity 112a.

For example, the multiple sets of embeddings 114a-114d and/or embedding elements 116a-118d may be generated using neural network techniques such as, by way of example only but not limited to, FNN, RNN, CNN, WaveNet type networks, and/or any other neural network configured to generate an embedding from data representative of associated with a portion of text 108 or and/or training data item 112 associated with the portion of text 108. The neural network techniques may be trained to generate an embedding model during training, by the ML module 104, of an ML model or classifier configured to receive a composite embedding 114 of the present invention. The neural network techniques may be trained based on training dataset 110, which includes a plurality of training data items each of which are input to the embedding module 104. The embedding module 104 generates embeddings of one or more specific entity(ies) of interest 112a-112d and embeddings of one or more entity(ies) associated with the specific entity(ies) of interest that are associated with each training data item 112, which are processed by the neural network. The one or more entity(ies) associated with the entity(ies) of interest may be derived of selected from one or more hierarchical trees or graphs of which the corresponding specific entity of interest is a member (e.g. entity ontologies, syntax or grammar trees and the like).

The neural network may, by way of example only but is not limited to, generate a latent vector space defining each set of embeddings 114a-114d for each training data item of the training dataset. Thus, once the neural network of the embedding module 102 is trained on the training dataset, and also the ML model or classifier, multiple sets of embeddings may be output or read from the latent space representation of the sets of embeddings. The latent space representation for each of the sets of embeddings 114a-114d and for each embedding element 116a-118d of each of the sets of embeddings 114a-114d may be stored in an embedding vocabulary dataset.

The embedding vocabulary dataset may be used for generating further sets of embeddings from further portions of text or data items that may be input to the embedding module 102, some of which the embedding module 102 and/or ML module 104 have not seen. The embedding module 102 performs a look-up in the embedding vocabulary dataset 103a in relation to each entity of interest that is input or corresponds to the portion of text 108, and retrieves the corresponding embedding elements and/or sets of embeddings associated with the entity(ies) of interest and the corresponding entity(ies) associated with the entity(ies) of interest. Any entity(ies) of interest that are not found in the embedding vocabulary dataset 103a, but which are found in the corresponding hierarchical graphs/trees may have any embeddings of the corresponding entity(ies) associated with those entity(ies) of interest retrieved from the embedding vocabulary dataset 103a. The set of embeddings for any unseen entity(ies) or entity(ies) not existing in the entity embedding vocabulary dataset 103a may include a out-of-vocabulary embedding element in place of the entity of interest not found in the vocabulary 103a, and include subsequent embedding elements for any entities associated with the entity of interest that are found in the vocabulary 103a, or out-of-vocabulary embedding elements for those entities associated with the entity of interest not found in the vocabulary 103a.

Figure 1E:
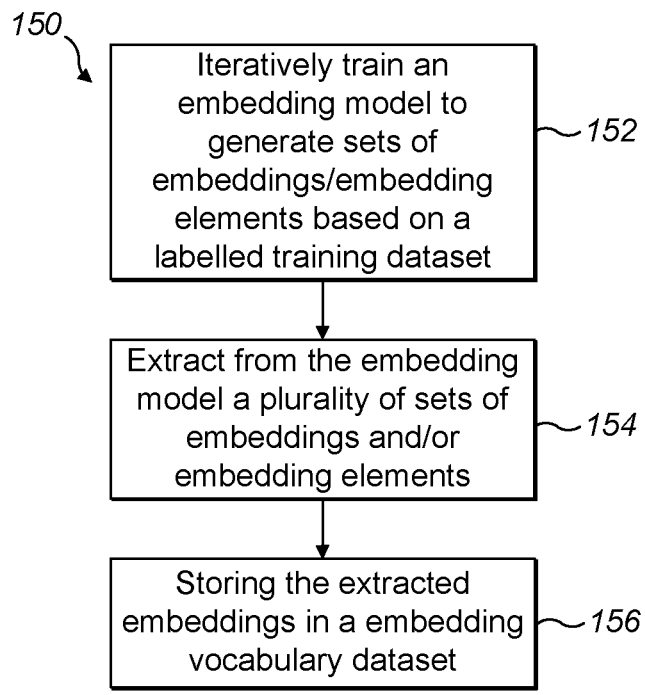
FIG. 1e is a flow diagram illustrating another example method for generating the embedding vocabulary dataset according to the present disclosure.

FIG. 1e is a flow diagram illustrating another example method 150 for generating the embedding vocabulary dataset 103a based on the method 140. The method 150 is based on the following steps of: In step 152, method 140 may be performed to iteratively train an embedding ML model and corresponding ML model or classifier based on the labelled training dataset 110. The embedding ML model is coupled to the ML model or classifier and configured to generate a plurality of sets of embeddings and embedding elements associated with the labelled training dataset for inputting to the ML model or classifier during training. In step 154, the embedding module 102 extracts, when the embedding ML model has been validly trained or during training, the generated sets of embeddings and/or embedding elements associated with all of the multiple separable entities and also the generated entities associated with the corresponding multiple separable entities. In step 156, the extracted sets of embeddings and/or embedding elements are stored in an embedding vocabulary dataset 103a for use by step 134 of method 130 when generating sets of embeddings associated with portions of text.

Figure 1F:
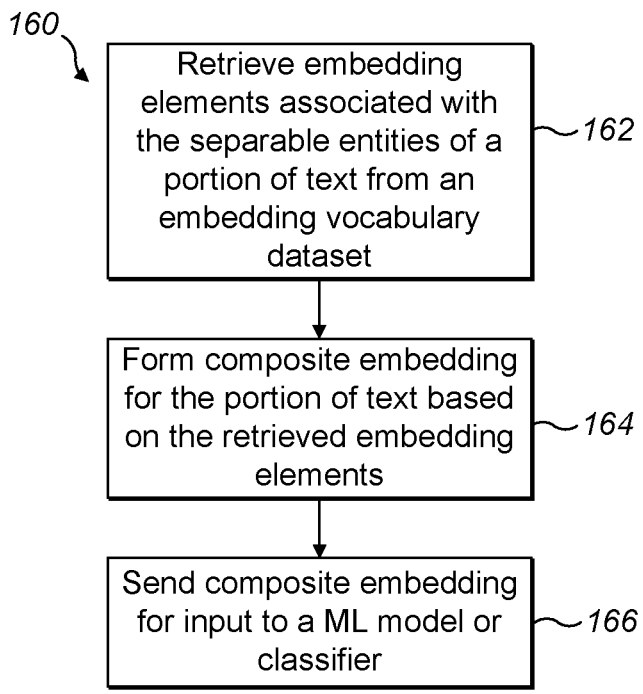
FIG. 1f is a flow diagram illustrating an example method for generating a set of embeddings for each multiple separable entities using an embedding vocabulary dataset according to the present disclosure.
Figure 1G:
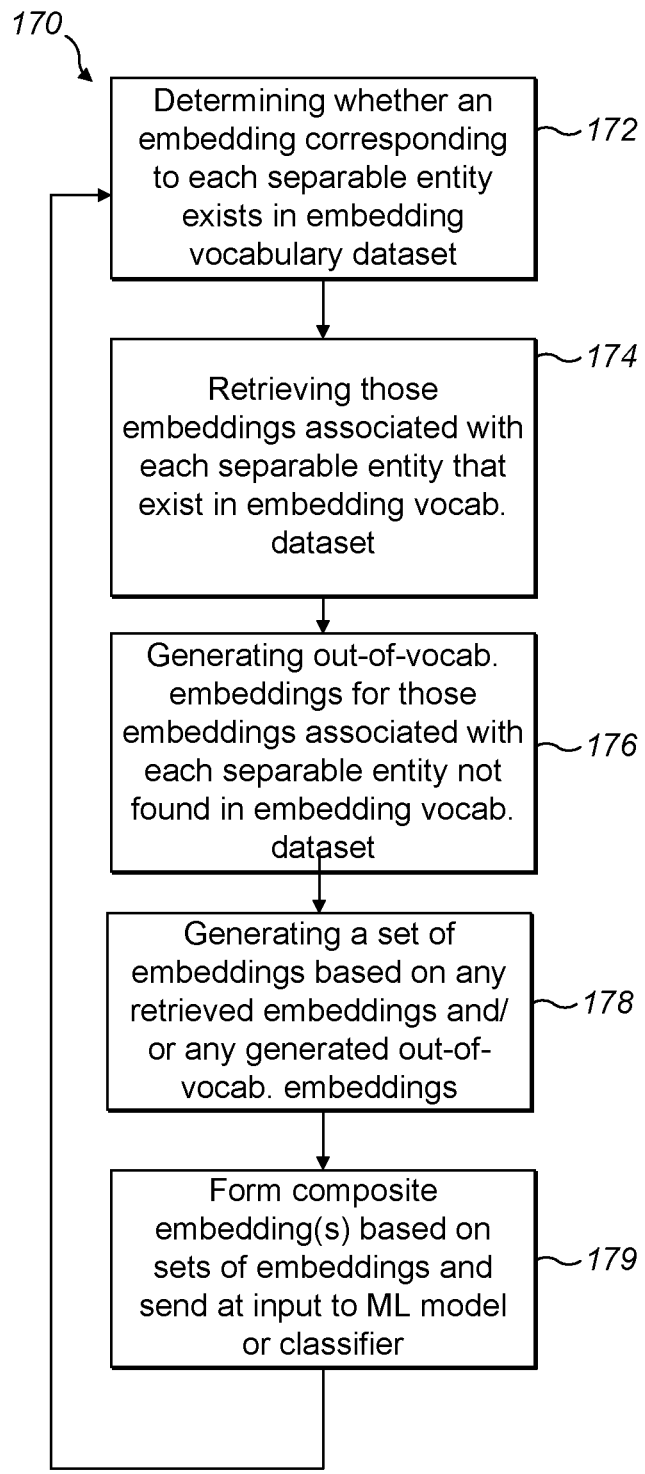
FIG. 1g is a flow diagram illustrating an example method for generating a set of embeddings based on the embedding vocabulary dataset according to the present disclosure.

FIG. 1f is a flow diagram illustrating an example method 160 for generating a set of embeddings for each multiple separable entities using an embedding vocabulary dataset 103a as generated by method 150. The example method 160 may be performed by step 134 of method 130 when generating a set of embeddings for each portion of text 108 or data item 112. The method 160 may include the following steps of: In step 162, retrieving, for each separable entity 112a-112d of the received portion of text 108 or training data item 112, one or more embedding elements 116a-116d associated with a specific entity 112a-112d and any subsequent embedding elements 118a-118d of one or more entity(ies) associated with said separable entity from the embedding vocabulary dataset 103a.

In step 164, forming, for each separable entity 112a-112d of the received portion of text 108 or training data item 112, a set of embeddings 114a-114d associated with said each of the separable entity(ies) 112a-112d based on the retrieved one or more embedding elements 116a-118d. This may include combining multiple sets of embeddings 114a-114d associated with the received portion of text 108 or data item 112 by combining or concatenating each of the sets of embeddings 114a-114d of the multiple separable entities 112a-112d to form a composite embedding 114. Each set of embeddings 114a-114d may be an multi-dimensional vector from a multi-dimensional latent vector space, thus, each of the embedding vectors may be concatenated to form a matrix of column or row vectors representing the composite embedding 114. In step 166, the composite embedding 114 may be sent to ML module 104 for input to a ML model or classifier and used accordingly.

For example, the set of embeddings for each of the multiple separable entities may be generated by the embedding model 102a in the form of an embedding vector, and each of the multiple embedding elements corresponds to multiple sub-vectors of the embedding vector. The multiple sub-vectors may include a specific sub-vector including data representative of the embedding of the specific separable entity, and one or more subsequent sub-vectors including data representative of the embedding of the entity associated with the specific separable entity. These embedding vectors and sub-vectors may be stored in the embedding vocabulary dataset 103a. The multiple embedding vectors associated with the multiple sets of embeddings may then be retrieved based on step 162 and in step 164 combined into a composite embedding by forming a composite embedding matrix of embedding vectors, where each embedding vector forms a row or a column of the composite embedding matrix. Alternatively or additionally, the multiple embedding vectors associated with the multiple sets of embeddings may be retrieved based on step 162 and in step 164 and combined into a set of vectors to form a composite embedding 114. The composite embedding 114, which is now a composite embedding matrix or even a set of embedding vectors, may then be input to the ML module 104 accordingly or as described herein.

Step 162 may include further steps for retrieving, for each separable entity of the received portion of text, one or more embedding elements from the embedding vocabulary dataset 103a. These further steps may include: determining whether an embedding corresponding to at least the separable entity (e.g. a specific embedding element 116a) and an embedding for one or more entities associated with the separable entity (e.g. embedding element 118a) exists in the embedding vocabulary dataset 103a for each said separable entity 112a-112d of a portion of text. Thus, only those embeddings that exist in the embedding vocabulary dataset 103a may be retrieved for said separable entity 112a. For those embeddings that do not exist or are not found in the embedding vocabulary dataset, an out-of-vocabulary embedding may be generated and used in the set of embeddings for said separable entity. A set of embeddings may then be generated for said separable entity based on at least one of any retrieved embeddings from the embedding vocabulary dataset 103a and any generated out-of-vocabulary embeddings.

The example method 130 and 160 may be used for converting text portions into composite embeddings for input as queries or relationship extraction and the like to a trained ML model or classifier. Thus the text portions may be unseen or unknown by the embedding module 102 and ML module 104, and hence unknown or unseen by the embedding model and/or ML model/classifier. When the portion of text includes one or more unknown entity(ies) of interest associated with one or more relationship entity(ies) of a relationship, then steps 134-136 of method 130 and/or steps 162-166 of method 160 may be performed for generating the corresponding composite embedding of the portion of text. The resulting composite embedding may be input to an ML model or classifier trained on a training dataset of composite embeddings for predicting, by way of example only but not limited to, whether there is evidence supporting the relationship of the portion of text.

In another example, in a relationship extraction type ML model or classifier, the ML model or classifier may have been trained based on composite embeddings of a training dataset. Thus one or more portions of text may be input to the ML model or classifier to determined whether there is evidence for each of the portions of text exhibiting a particular relationship, or any other query. Each of the portions of text may be processed by the embedding module 102 based on steps 134-136 of method 130 and/or steps 162-166 of method 160 to form a composite embedding for each portion of text. Embeddings for any unseen or unknown separable entities and/or unseen or unknown entities associated with the separable entities are set as an out-of-vocabulary embedding as described herein. Each of the one or more portions of text may be input to the ML model or classifier as a corresponding composite embedding, where the ML model or classifier processes the composite embedding to determined or identify whether there is evidence of a particular relationship for one or more biological entity(ies) associated with the composite embedding. The ML model or classifier may be configured to output evidence for whether each of the portions of text exhibit the particular relationship.

The following describes examples of using the embedding system 100, embedding module 102 and ML module 104 for generating and using a composite embedding for training ML models and/or querying ML models based on portions of text from a corpus of text in, by way of example only but is not limited to, the bioinformatics and/or chem(o)informatics fields. Rather than generating all combinations of sentences (or portions of text) from specific to generic, generic to specific, and/or specific to more specific and combinations thereto and then embedding each sentence as a vector, the embedding technique of the present invention generates a composite embedding comprising multiple embedding vectors in which each vector represents an embedding for each of a separable entity to one or more genericised and/or specificised entity(ies) associated with the separable entity of the sentence (also known as portion of text). The embedding technique receives a particular sentence or text portion and generates an embedding that allows improved training of ML models or classifiers and relationship extraction in, by way of example only but not limited to, the bioinformatics and/or chem(o)informatics fields.

As described above, a particular sentence or portion of text may include multiple separable entities that describe a relationship between entities of interest (e.g. biological entities based on entity types such as, by way of example only but not limited to: drugs, genes, diseases, proteins etc.). Each sentence or portion of text includes one or more separable entities of interest, and a relationship associated with the one or more separable entities of interest. The sentence or portion of text also includes multiple separable relationship entities (or sentence entities) describing the relationship associated with the one or more separable entity(ies) of interest.

For example, the sentence (aka portion of text)—"Alzheimer's Disease (AD) is treated by modulating LRP1" may be processed to extract multiple separable entities. The processing may be based on, by way of example only but not limited to, a name entity recognition (NER) system and/or natural language processing (NLP) system that is configured to identify words and/or phrases in the sentence as either entities of interest and/or relationship/sentence entities. Although this NER and NLP are described herein, this is for simplicity and by way of example only and the invention is not so limited, it is to be appreciated by the skilled person that that are many methods and/or processes for extracting multiple separable entities associated with entities of interest and relationship entities from portions of text depending on the application or as the application demands. It is assumed that some sort of processing is performed to convert a text portion or sentence into data representative of one or more specific entity(ies) of interest (e.g. biological entity(ies)) describing each entity and one or more relationship or sentence entity(ies) describing the relationship with the one or more entities of interest.

The sentence "Alzheimer's Disease (AD) is treated by modulating LRP1" may thus be assumed to be processed to identify and extract the multiple separable entities. The biological entities of interest of this sentence include a first biological entity of interest of a disease entity type, namely, "Alzheimer's Disease" and a second biological entity of interest of a protein/gene entity type, namely, "LRP1". The relationship between the first and second biological entity includes the phrase "is treated by modulating". The following separable entities may be retrieved from the sentence: "Alzheimer's Disease (AD)" (a biological entity of the disease type); "is" (relationship/sentence entity); "treated" (relationship/sentence entity); "by" (relationship/sentence entity); "modulating" (relationship/sentence entity); and "LRP1" (a biological entity of the protein/gene type).

The embedding technique according to the invention forms a composite embedding of the specific sentence, the composite embedding including, by way of example only but not limited to, multiple sets of embeddings in the form of multiple embedding vectors, in which each embedding vector describes each separable entity of the sentence. Each of set of embeddings includes multiple embedding elements in the form of sub-vectors or portions of the embedding vector. Each embedding vector may be divided into multiple portions or sub-vectors, with a first portion representing one of the separable entities of the sentence (e.g. separable entity of interest or relationship entity), and subsequent portions of the embedding vector representing an embedding of an entity associated with the separable entity of the embedding vector.

Figure 2A:
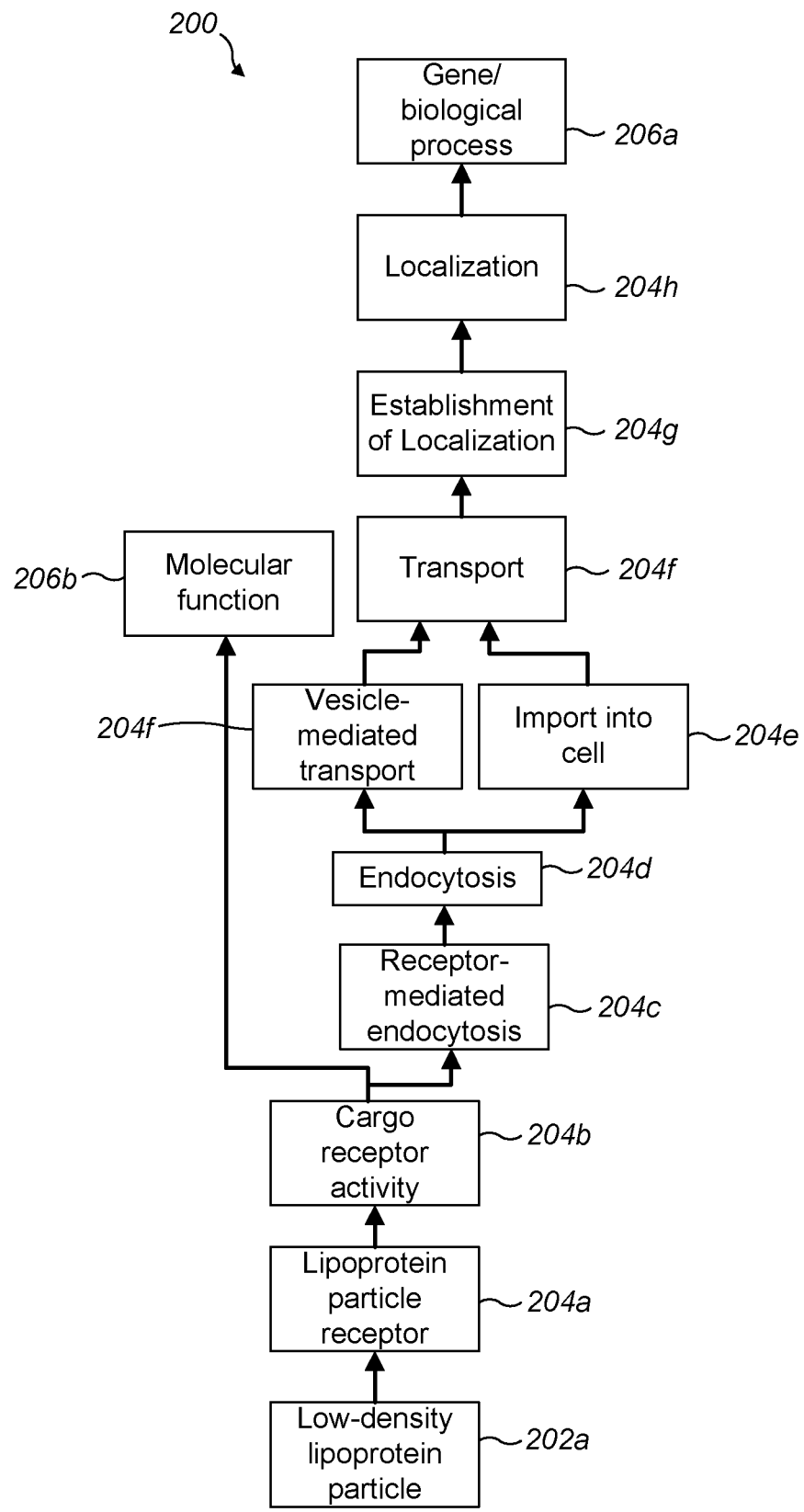
FIG. 2a is a schematic diagram illustrating a portion of a hierarchical graph or tree for biological entities of the gene entity type for use with the embedding techniques according to the present disclosure.

FIG. 2a is a schematic diagram illustrating a portion of a hierarchical graph or tree 200 for biological entities of the protein/gene/molecular type of entities. In this example, the hierarchical graph or tree 200 is based on a gene ontology in which a child node 202a represents a specific gene or protein entity called low-density lipoprotein particle or LRP1. The child node 202a is linked by an edge to one or more parent nodes 204a-204h, which describe the child node 202a of the specific gene or protein entity in a broader or more generic manner when a path is parsed from the child node 202a up to the root node(s) 206a-206b. That is, each parent node 204a-204h and root node(s) 206a-206b represents a hierarchical or genericised entity associated with the specific entity of child node 202a.

Furthermore, each parent node 204a-204h is a child node of the parent node or root node above it. The each parent node 204a-204h is also specificised entity associated with the generic entity of the parent node or root node above it. Although in this example the specific entity is represented by node 202a, it is apparent that any of the parent nodes 204a-204h may also be considered a specific entity (e.g. is part of a portion of text or training data item) in which case the parent nodes 204b-204h and root nodes 206a or 206b that may be on a path parsed from the specific entity associated with one of the parent nodes 204a-204h represents one or more genericised entities associated with the specific entity represented by that parent node. Furthermore, if a specific entity is represented by one of the parent nodes 204a-204h, then any child node on a path parsed from the specific entity may represent one or more specificised entities associated with the specific entity represented by one of the parent nodes 204a-204h. The root node 206a or 206b and each parent node 204a-204h represents a genericised entity in relation to their child nodes, which include one or more of parent nodes 204a-204h or specific node 202a. Similarly, each parent node 204a-204h or node 202a may represent a specificised entity associated with the specific entity represented in relation to their parent nodes, which include one or more of root nodes 206a or 206b and parent nodes 204a-204h. Any node in the hierarchical graph or tree 200 may be considered a specific entity if that node corresponds to an entity of a text portion in which parent nodes or nodes above the node associated with the specific entity are genericised entities associated with the specific entity and child nodes or nodes below the node associated with the specific entity are specificised entities associated with the specific entity.

The gene hierarchical graph/tree 200 may be used by the embedding module 102 for selecting one or more entities associated with a biological entity of interest (or a specific entity found or extracted from a portion of text). This may be achieved by the embedding module 102 locating or identifying a node in the graph 200 as a specific entity node corresponding to the biological entity of interest, extracted from a sentence (or portion of text), in the gene hierarchical graph 200. The hierarchical graph 200 may be parsed from the specific entity node up to the root node and/or from the specific entity node down to leaf nodes or child nodes. Whilst parsing the hierarchical graph 200, the embedding module 102 may select one or more entities associated with the entity of interest that correspond to one or more parent nodes above the specific entity node and/or corresponding to one or more child nodes or leaf nodes below the specific entity node. Given that there may be a lot of parent nodes between the specific entity node and the root node and/or between the specific entity and the leaf nodes, the embedding module 102 may use one or more rules for selecting appropriate entities associated with the entity of interest whilst parsing the graph 200.

As an example, a specific biological entity of interest in the gene/protein type may be extracted from the sentence "Alzheimer's Disease (AD) is treated by modulating LRP1" as "LRP1". Node 202a of graph 200 is identified to correspond to the specific biological entity of LRP1. The path of parent nodes 204a-204h from node 202a to node 206a may be parsed in which each third parent node is selected to be a genericised entity associated with the specific biological entity of interest. Thus, the parent nodes 204c, 204f and root node 206a may be used to form the set of genericised entities associated with the specific biological entity of LRP1, which are: "receptor-mediated endocytosis", "transport", and "biological process". As described with reference to FIGS. 1a to 1e, the set of genericised entities may be used to form a set of embeddings in relation to the specific biological entity of LRP1. The set of embeddings associated with LRP1 may then be used when forming a composite embedding associated with the above sentence or portion of text in relation to "Alzheimer's Disease" or any sentence associated with "LRP1".

Figure 2B:
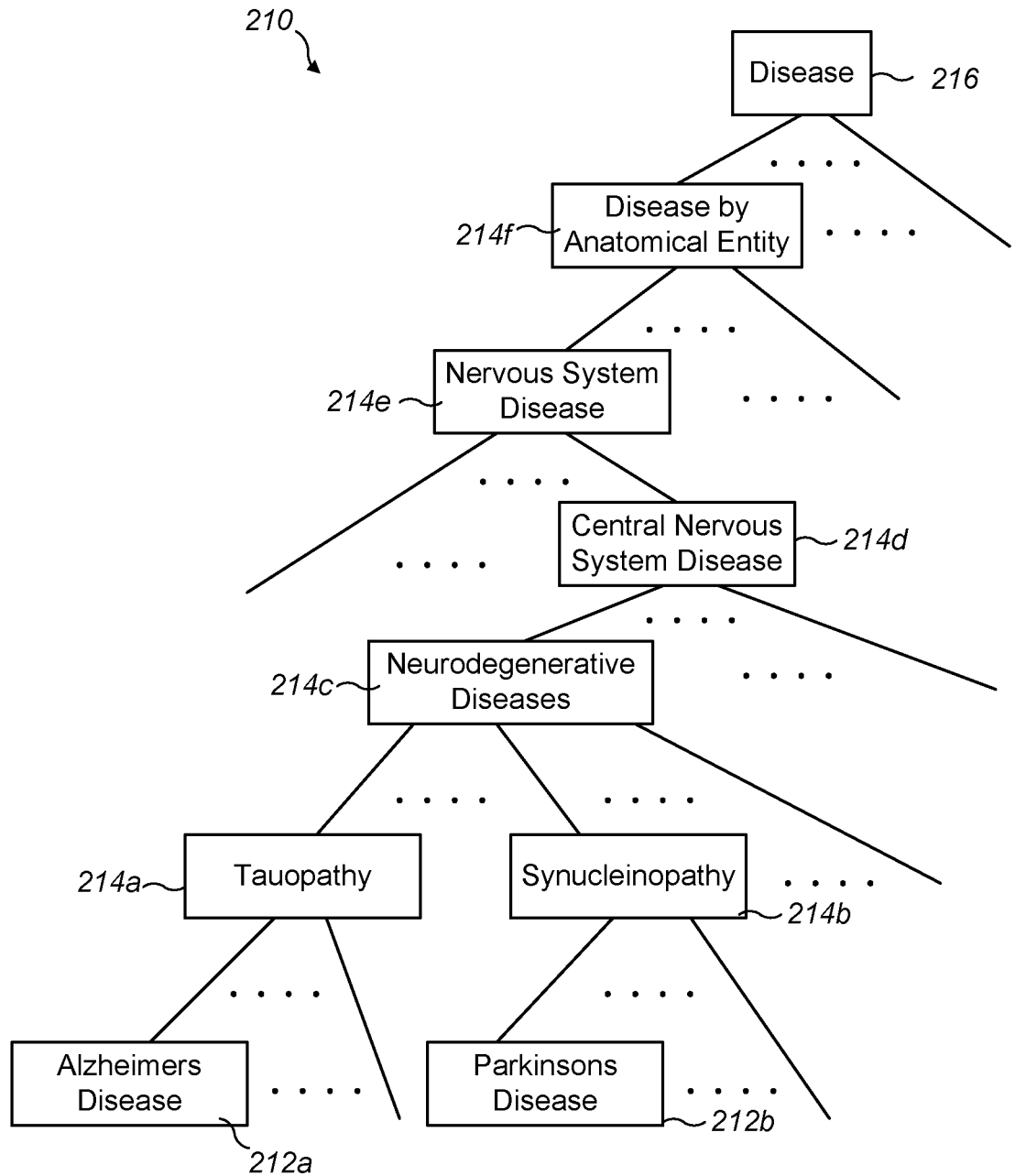
FIG. 2b is a schematic diagram illustrating a portion of a hierarchical graph or tree for biological entities of the disease entity type for use with the embedding techniques according to the present disclosure.

FIG. 2b is a schematic diagram illustrating a portion of a hierarchical graph or tree 210 for biological entities of the disease type of entities. In this example, the hierarchical graph or tree 210 is based on a disease ontology in which a child node 212a represents a specific disease entity called Alzheimer's Disease (AD). The child node 212a is linked by an edge to one or more parent nodes 214a, 2124c-214f, which describe the child node 212a of the specific disease entity in a broader or more generic manner when a path is parsed from the child node 212a up to the root node 216. That is, each parent node 214a, 214c-214f and root node 216 represents a hierarchical or genericised entity associated with this specific entity of child node 212a. Each of the parent nodes 214a-214f and root node 216 may also be considered specificised entities associated with any generic entity of one or more parent nodes or root node above it.

Similarly, another child node 212b is illustrated in graph 210 and represents a specific disease entity called Parkinson's Disease (PD). The child node 212b is linked by an edge to one or more parent nodes 214b, 2124c-214f, which describe the child node 212b of the specific disease entity in a broader or more generic manner when a path is parsed from the child node 212b up to the root node 216. It is apparent that each parent node 214b, 214c-214f and root node 216 represents a hierarchical or genericised entity associated with this specific entity of child node 212b.

Furthermore, each parent node 214a-214f is also child node of one or more parent nodes or root node above it. Although in this example the specific entity is represented by node 212a or 212b, it is apparent that any of the parent nodes 214a-214f may also be considered to be or represent a specific disease entity in a portion of text in which case the parent nodes 214a-214h and root node 216 above such parent nodes represent one or more genericised entities associated with the specific entity represented by that parent node. The root node 216 and each parent node 214a-214f represents a hierarchical entity in relation to their child nodes, which include one or more of parent nodes 214a-214f or specific node 212a or 212b. Any node in the hierarchical graph or tree 210 may be considered a specific entity if that node corresponds to an entity of a text portion in which its parent nodes or nodes parsed on a path above the node associated with the specific entity are genericised entities associated with the specific entity and those child nodes or leaf nodes parsed on a path below the node associated with the specific entity are specificised entities associated with the specific entity.

The disease hierarchical graph/tree 210 may be used by the embedding module 102 for selecting one or more entities (a.k.a. hierarchical entities or genericised/specificised entities) associated with a specific biological entity of interest of the disease type. This may be achieved by the embedding module 102 locating or identifying a node in the graph 210 as a specific entity node corresponding to the specific biological entity of interest of the disease type, extracted from a sentence (or portion of text), in the disease hierarchical graph 210. The hierarchical graph 210 may be parsed from the specific entity node up to the root node and/or from the specific entity down to one or more lower child nodes or leaf nodes (if any). Whilst parsing the hierarchical graph 210, the embedding module 102 may select one or more genericised and/or specificised entities associated with the specific biological entity of interest that correspond to or are represented by one or more parent nodes above, or one or more child nodes below, the specific entity node. Given that there may be a lot of parent nodes between the specific entity node and the root node, and/or from the specific entity node to the one or more child nodes below or leaf nodes (if any), the embedding module 102 may use one or more rules for selecting appropriate genericised and/or specificised entities associated with the specific biological entity of interest whilst parsing the graph 210.

As an example, a specific biological entity of interest of the disease entity type may be extracted from the sentence "Alzheimer's Disease (AD) is treated by modulating LRP1" as "Alzheimer's Disease (AD)". Node 212a of graph 210 is identified to correspond to the specific biological entity of Alzheimer's Disease. The path of parent nodes 214a, 214c-214f from node 212a to node 216 may be parsed in which every second parent node is selected to be a genericised entity associated with the specific biological entity of interest. Thus, the parent nodes 214c, 214e and root node 216 may be used to form a set of genericised entities associated with the specific biological entity of Alzheimer's Disease, which include: "Neurodegenerative Diseases", "Nervous System Disease", and "Disease". As described with reference to FIGS. 1a to 1e, the set of genericised entities associated with the entity of interest may be used to form a set of embeddings in relation to the specific biological entity of Alzheimer's Disease. This may be used when forming the composite embedding associated with the above sentence or portion of text in relation to "Alzheimer's Disease" and/or any other sentence including "Alzheimer's Disease" and the like.

Figure 2C:
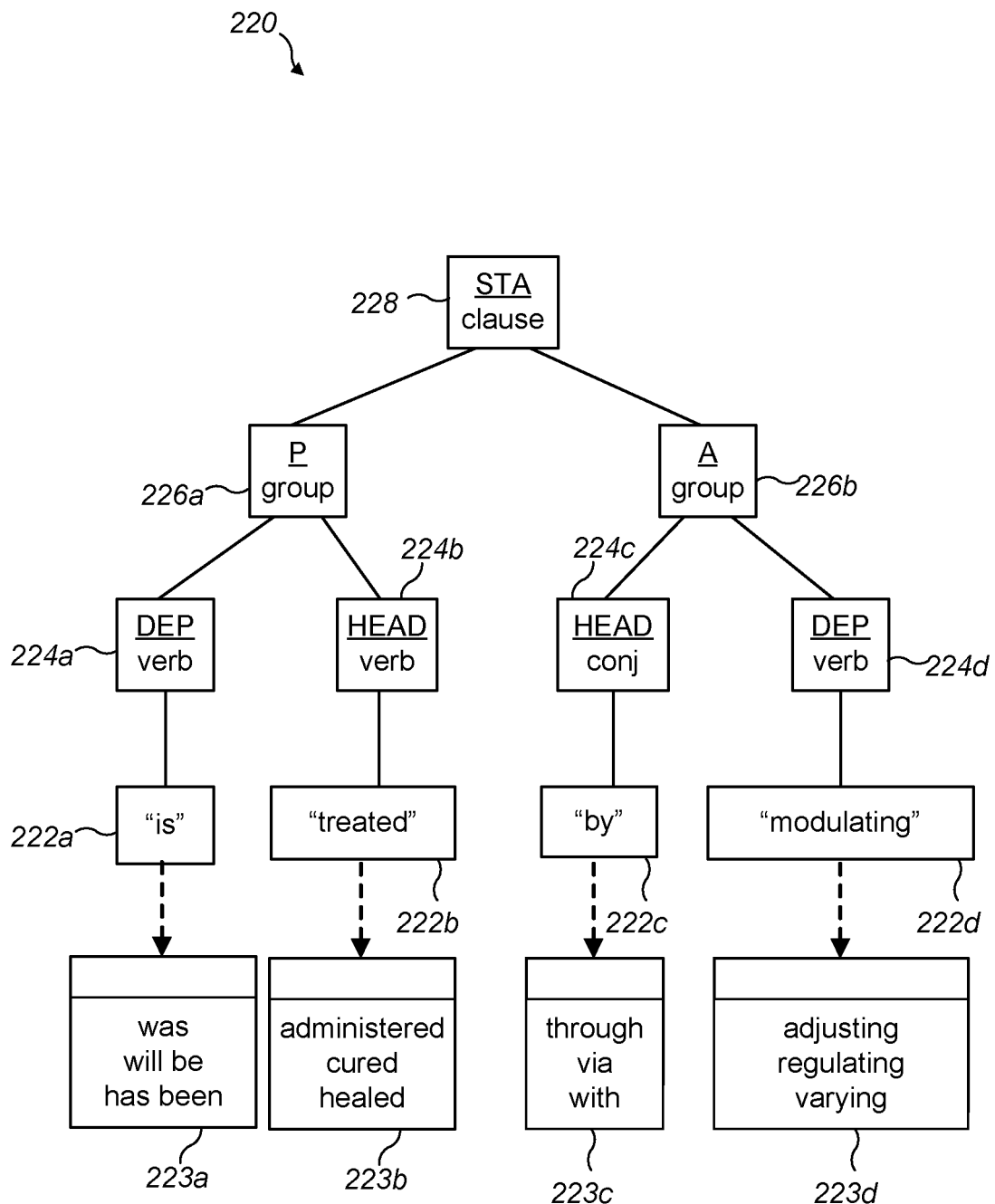
FIG. 2c is a schematic diagram illustrating a portion of a hierarchical graph or tree for relationship entities for use with the embedding techniques according to the present disclosure.

FIG. 2c is a schematic diagram illustrating a portion of a hierarchical graph or tree 220 for relationship or sentence entities. In this example, the portion of hierarchical graph or tree 220 is based on a syntax grammar tree in which each child node 222a-222d represents a specific relationship entity of the relationship "is treated by modulating". One or more syntax of grammar trees may be generated for each of the relationships associated with text portions associated with training data items of a training dataset. These may be merged or used separately in relation to the relationship entities generated from the relationships. Although a syntax grammar tree is described in this example, this is by way of example only and the hierarchical graph or tree 220 is not so limited, it is to be appreciated by the skilled person that relationship and sentence entities may be represented by other types of hierarchical graphs, trees, data structures and/or systems based on, by way of example only but not limited to, sentence/word/syntax tagging systems (e.g. Word-class Tagging—http://ucrel.lancs.ac.uk/bnc2/bnc2autotag.htm), grammatical relationship annotation systems (e.g. grammatical relationship annotation—http://users.sussex.ac.uk/~johnca/grdescription/index.html), and/or any other tree, graph, structure, and/or system as the application demands that is suitable for generalising or specificising one or more specific relationship entities of a relationship and the like or as the application demands.

The child node 222a represents the specific relationship entity "is"; the child node 222b represents the specific relationship entity "treated"; the child node 222c represents the specific relationship entity "by"; and the child node 222d represents the specific relationship entity "modulating". Each of these child nodes 222a-222d is linked by an edge to a corresponding parent nodes 224a-224d at the level above those of the child nodes 222a-222d. Each of the parent nodes 224a-224d describe the grammatical syntax of the child nodes 222a-222d of each specific relationship entity in a broader or more generic manner. Each of the parent nodes 224a-224d are further linked by an edge to a corresponding parent nodes 226a-226b of the next level which each further describe the grammatical syntax of the parent nodes 224a-224d in a broader or more generic manner. The root node 228 is the most generic node, which describes any node as a sentence. Each parent node 224a-224d and 226a-226b and root node 228 represents a hierarchical entity associated with each of the one or more specific entity of child nodes 222a-222d.

Furthermore, as an option, the grammar tree 220 may be extended such that each leaf node 222a-222d of a separable or specific relationship entity extracted from a text portion may be connected or linked to an entity list of one or more synonyms or corresponding phrases 223a-223d that are associated with the specific or separable relationship entity. For example, a list of synonyms/phrases 223a-223d for each separable relationship entity represented by nodes 222a-222d may be generated based on, by way of example only but not limited to, a thesaurus look-up of the "string" associated with the separable relationship entity. For example, the synonyms of the relationship entity "treated" may include "administered", "cured", or "healed"; the synonyms of the relationship entity "by" may include "through", "via" or "with"; the synonyms of the relationship entity "modulating" may include "adjusting", "regulating", or "varying". These may be manually curated to ensure the general meaning or concepts are retained. Each list of synonyms 223a-223d associated with a relationship entity may be linked to each leaf node 222a-222d of the corresponding separable relationship entity. One or more of these may be selected as entities associated with the separable relationship entity. Each entity list 223a-223d may be ranked or ordered based on the frequency of use of the synonyms or phrases in the list in which the most common synonyms are selected first and least common selected last when generating one or more entities associated with the corresponding separable relationship entity.

Furthermore, each parent node 224a-226b is also child node of one or more parent nodes or root node 228 above it. Although in this example the specific or separable relationship entities are represented by nodes 222a-222d, it is apparent that any of the parent nodes 224a-226b may also be considered to be or represents a specific relationship entity in which case the parent nodes 226a-226b and root node 228 above such parent nodes represent one or more genericised or hierarchical entities associated with the specific relationship entity represented by that parent node. Similarly, each parent node 224a-226b and child node 222a may represent a specificised entity associated with the specific entity represented in relation to their parent nodes, which include root node 228, parent nodes 224a-226b. The root node 226 and each parent node 224a-226b represents a genericised or hierarchical entity in relation to their child nodes, which include one or more of parent nodes 224a-226b or specific nodes 222a-222d. Any node in the hierarchical graph or tree 220 may be considered a specific entity if that node corresponds to an entity of a text portion in which parent nodes or nodes above the node associated with the specific entity are genericised entities associated with the specific entity and child nodes or nodes or lists of entities below the node associated with the specific entity are specificised entities associated with the specific entity.

The grammar hierarchical graph/tree 220 may be used by the embedding module 102 for selecting one or more entities associated with a separable relationship entities (e.g. relationship entities extracted from a portion of text). This may be achieved by the embedding module 102 locating or identifying a node in the graph 220 as a specific entity node corresponding to the separable relationship entity, extracted from a sentence (or portion of text), in the hierarchical graph 220. The hierarchical graph 220 may be parsed from the specific entity node up to the root node and/or from the specific entity node down to leaf nodes or child nodes 222a-222d and/or entity lists 223a-223d. Whilst parsing the hierarchical graph 220, the embedding module 102 may select one or more entities associated with the separable relationship entity that correspond to or is represented by one or more parent nodes above the specific entity node and/or corresponding to one or more child nodes or leaf nodes, lists of entities below the specific entity node. Given that there may be a lot of parent nodes between the specific entity node and the root node and/or between the specific entity, leaf nodes 222a-222d and/or entity lists 223a-223d, the embedding module 102 may use one or more rules for selecting appropriate entities associated with each separable relationship entity whilst parsing the graph 220.

As an example, a separable relationship entity may be extracted from the sentence "Alzheimer's Disease (AD) is treated by modulating LRP1" as "modulating". Node 222d of graph 220 is identified to correspond to the separable relationship entity of modulating. The path of parent nodes 224d, 226c and 228 may be parsed and one or more nodes selected to be a genericised entity associated with the separable relationship entity of modulating. Alternatively or additionally, the path to entity list 223d may be parsed and one or more entities associated with the separable relationship entity of modulating may be selected from the list of entities 223d as specificised entity(ies) associated with the relationship entity of modulating. Thus, the parent nodes 224d, 226b and root node 228 may be used to form a set of entities associated with the separable relationship entity of modulating, which are: "Dependent Verb", "Adverbial group", and "Statement clause". Alternatively or additionally, one or more entities from the entity list 223d may be selected for inclusion into the set of entities associated with the separable relationship entity, which may include: "adjusting", "regulating", or "varying". As described with reference to FIGS. 1a to 1e, the set of entities associated with each separable relationship entity may be used to form a set of embeddings in relation to the separable relationship entity of modulating. This may be used when forming the composite embedding associated with the above sentence or portion of text in relation to "modulating", or any portion of text when "modulating" is used. Similarly, the separable relationship entities (e.g. "is", "treated", "by") of the relationship may also be parsed in a similar manner as separable relationship entity of modulating to provide a set of entities associated with each of these separable relationship entities for use in forming a composite embedding based on these separable relationship entities.

The embedding technique (or composite embedding technique) as described herein may be used as a front-end embedding component to a ML model or classifier for: training in which labelled training data (each labelled training data representing a specific sentence) is input and converted to the composite embedding that is used for training a ML technique to generate one or more ML models or classifiers; inputting queries or sentences related to unknown biological entities to a classifier, which identifies whether there is evidence supporting the relationship described by the sentence; relationship extraction, in which sentences from literature are input to a trained classifier/ML model trained to identify a particular relationship, and to output evidence of those sentences exhibiting the relationship from the literature.

In order to train an ML model or classifier, a training dataset is required that includes a plurality of training data items, each training data item including data representative of a particular sentence from a corpus of literature or text that describes a relationship with one or more entities of interest. As described with reference to FIGS. 1a-2c, each particular sentence includes separable entities that describe one or more entities of interest that are associated with a relationship. Each training data item may represent a sentence including multiple separable entities, the multiple separable entities including one or more separable entities of interest (e.g. biological entities) and also one or more separable relationship entities describing the relationship associated with the separable entities of interest of the sentence (or portion of text).

Figure 3A:
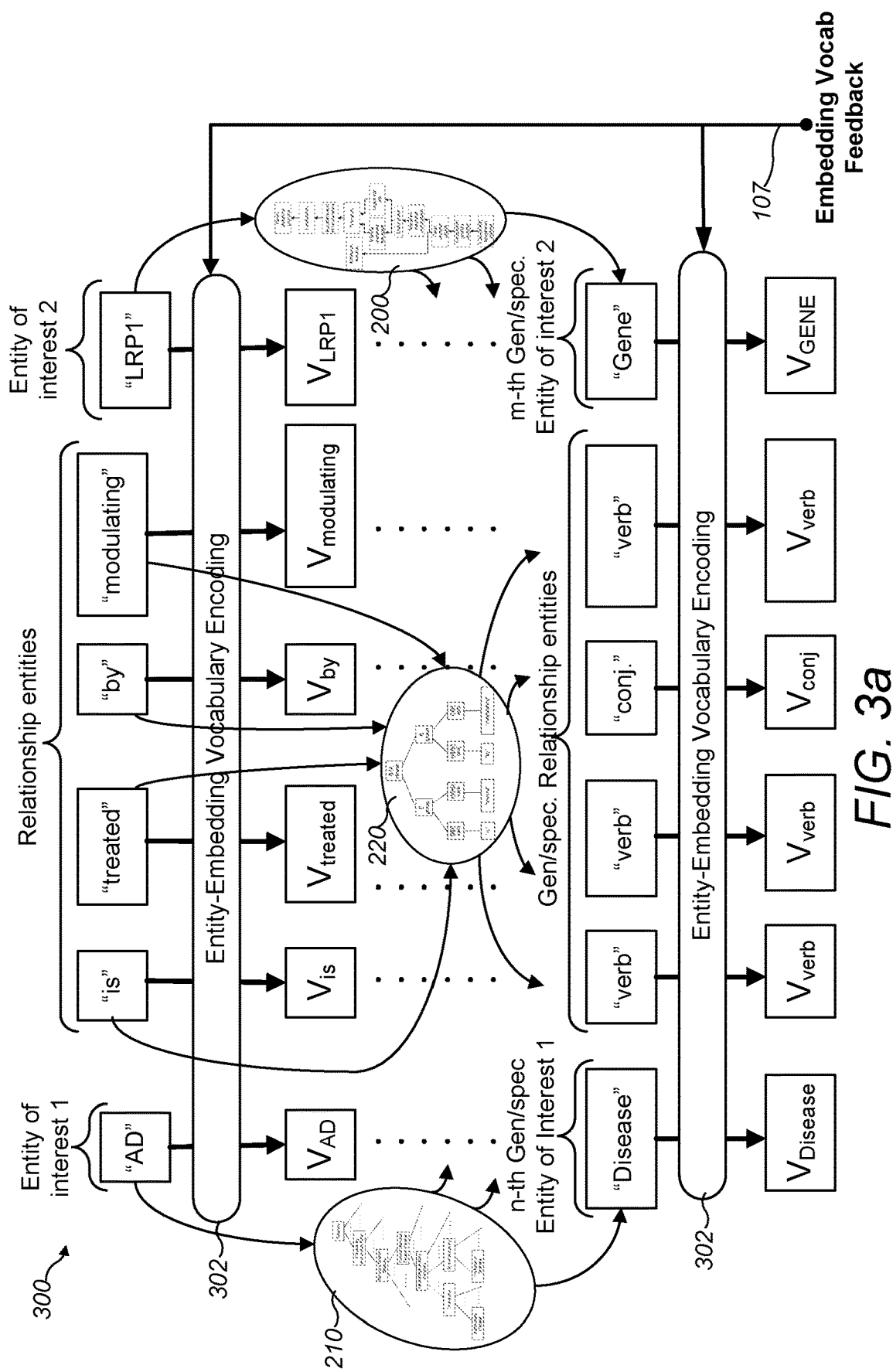
FIGS. 3a and 3b is a schematic diagram illustrating an example embedding system for generating a composite embedding according to the present disclosure.
Figure 3B:
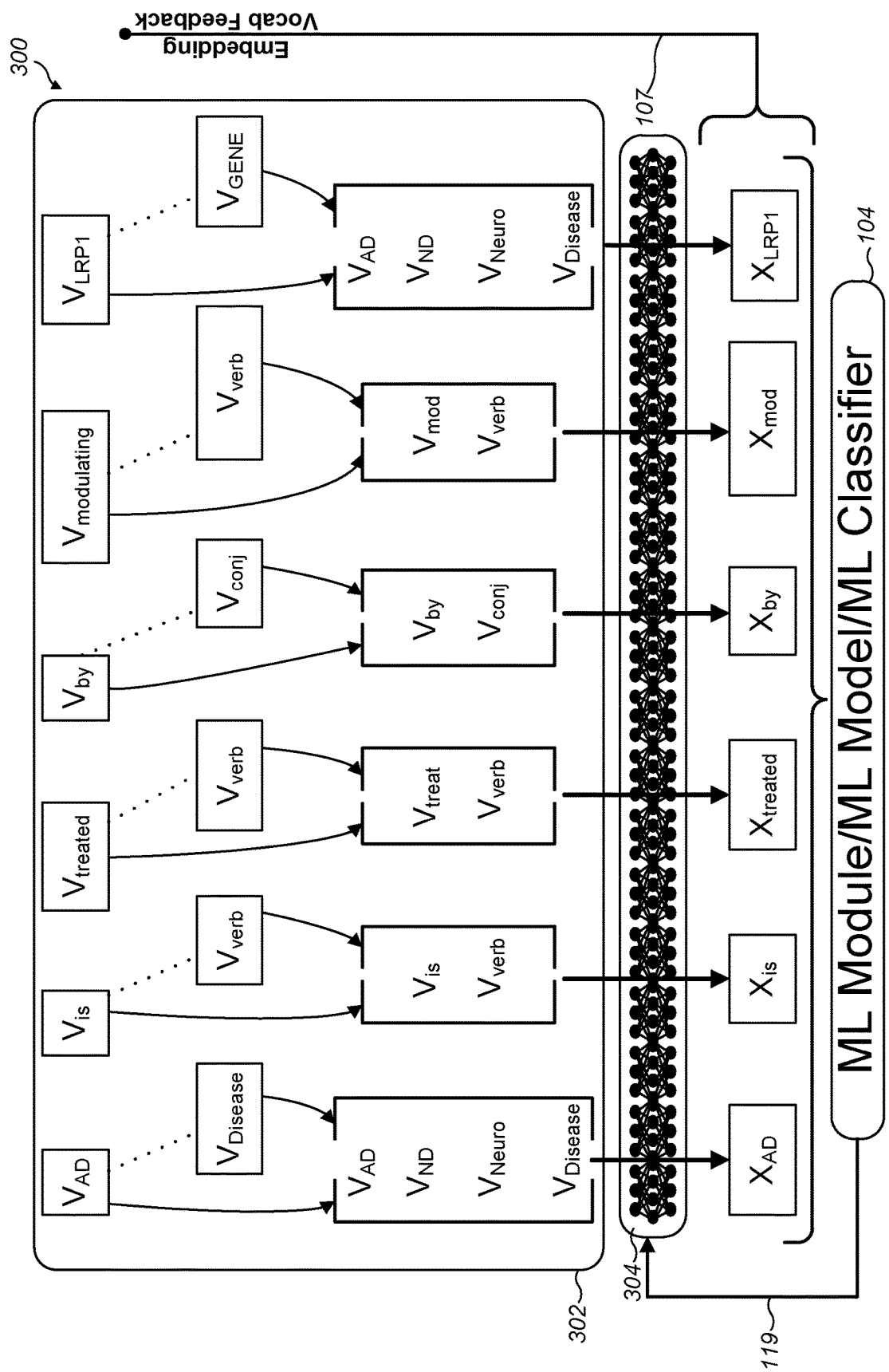

FIGS. 3a and 3b are schematic diagrams illustrating an example of embedding system 300 for generating a composite embedding for an example training data item of a training dataset, which may be used to train an ML technique to generate an ML model/classifier and also train an embedding ML model 304 for generating an entity embedding vocabulary dataset for use in generating composite embeddings for queries to a trained ML model/classifier. The embedding system 300 includes an entity-embedding vocabulary encoding module 302 for converting separable entities from "strings" or symbols into unique vectors or composite vectors for input to the embedding ML model 304, which generates a composite embedding for input to an ML module 104. The ML module 104 may be used to train an ML model or classifier, or may be used to query a trained ML model or classifier.

The training dataset includes a plurality of training data items (or sentences). In this case, a training data item represents training sentence "Alzheimer's Disease is treated by modulating LRP1". The embedding technique according to the invention is configured for receiving data representative of a specific sentence (or text portion) and generating a composite embedding allowing improved training of ML models and relationship extraction. Separable entities may be extracted from the text portion or sentence "AD is treated by modulating LRP1". The training data item may include data representative of multiple separable entities from the sentence "AD is treated by modulating LRP1" in which "AD" (e.g. separable biological entity of interest 1); "is" (separable relationship/sentence entity); "treated" (separable relationship/sentence entity); "by" (separable specific relationship/sentence entity); "modulating" (separable relationship/sentence entity); "LRP1" (separable biological entity of interest 2).

The embedding technique according to the invention forms a composite embedding of the specific sentence or text portion. In this example, the composite embedding may include multiple sets of embeddings, each set of embeddings associated with one of the multiple separable entities extracted from the text portion. A set of embeddings associated with a separable entity may be represented, by way of example only but is not limited to, as an embedding vector. Each embedding vector includes an embedding of the corresponding separable entity and an embedding of one or more entities associated with the separable entity. For example, each embedding vector may be divided into multiple portions or sub-vectors in which a first sub-vector represents an embedding of a separable entity of the multiple separable entities, and each subsequent one or more sub-vector(s) represent an embedding of one or more entity(ies) associated with the separable entity.

Each separable entity in the sentence "Alzheimer's Disease is treated by modulating LRP1" is identified as described above. Each separable entity may be represented as a string or a symbol. In this example, it is represented as a string. Each separable entity is input to an entity-embedding vocabulary encoding module 302, which contains an entity-embedding vocabulary dataset. The embedding vocabulary dataset may be pre-populated with separable entities derived from the training dataset, in which each separable entity may be mapped to an initial embedding sub-vector. The embedding vocabulary dataset may also be pre-populated with one or more entities associated with each separable entity by parsing the corresponding hierarchical graph or tree 200, 210, 220 associated with the separable entity. Each of the one or more entities associated with each separable entity may also be mapped to an initial embedding sub-vector. For example, the initial embedding sub-vector may be a random sub-vector.

The training dataset may be used by the embedding system 300 to train an embedding model 304 for generating composite embedding vectors, which may be used as input to ML module 104 for training a corresponding ML model or classifier. The composite embedding vector for the i-th identified separable entity $S_i$ of a sentence (or text portion) may be denoted $\chi_{S,i} = \theta_i([v_{SG,N_i}^T, v_{SG,N_i-1}^T, \ldots, v_{SG,1}^T, v_{S,i}^T]^T)$, where $\chi_{S,i}$ is a composite embedding column vector for the i-th separable entity and is based on the dimensions of each of the column component sub-vectors $v_{S,i}$, $v_{SG,N_i}$, $v_{SG,N_i-1}$, ..., $v_{SG,1}$ and $v_{S,i}$, which are column component embedding sub-vectors of the composite embedding of the i-th separable entity, each sub-vector having the same or different dimensions, and $\theta_i(\bullet)$ represents an update function based on a ML (e.g. neural network) optimisation step which may, by way of example only but is not limited to, modify the embedding vectors or representations thereof iteratively.

Each of the sub-vectors $v_{SG,N_i}$, $v_{SG,N_i-1}$, ..., $v_{SG,1}$ are embedding representations of each of the $N_i$ entities selected or generated from parsing the hierarchical graph or tree (e.g. ontology or from tagging information) associated with the i-th separable entity $S_i$, which may be read from the entity-embedding vocabulary dataset. The sub-vector $v_{S,i}$ is a embedding representation of the i-th separable entity $S_i$, which may also be read from the entity-embedding vocabulary dataset. $\chi_{S,i}$ is the composite embedding of the i-th identified separable entity $S_i$ after the column vector $[v_{SG,N_i}^T, v_{SG,N_i-1}^T, \ldots, v_{SG,1}^T, v_{S,i}^T]^T$ has been updated with the ML/neural network optimisation step represented by $\theta_i(\bullet)$.

As can be seen, each composite embedding vector $\chi_{S,i}$ includes $N_i+1$ sub-vector embeddings x corresponding to either the separable entity $S_i$ or one of the $N_i$ entities associated with the separable entity $S_i$. For example, $\chi_{S,i}$ may be represented as follows:

$$\chi_{Si} = \Theta_i\left(\left[v_{SG,N_i}^T, v_{SG,N_i-1}^T, \ldots, v_{SG,1}^T, v_{S,i}^T\right]^T\right) = \Theta_i\left(\begin{bmatrix} v_{SG,N_i} \\ v_{SG,N_i-1} \\ v_{SG,1} \\ v_{S,i} \end{bmatrix}\right) = \begin{bmatrix} x_{SG,N_i} \\ x_{SG,N_i-1} \\ x_{SG,1} \\ x_{S,i} \end{bmatrix}$$

Initially, each the embedding representations of the column component sub-vectors $v_{S,i}, v_{SG,N_i}, v_{SG,N_i-1}, \ldots, v_{SG,1}$ and $v_{S,i}$ for the i-th separable entity of a training data item are read from the populated entity-embedding vocabulary dataset, which has initialised the embeddings for each of these component sub-vectors to a random vector. The column vector $[v_{SG,N_i}^T, v_{SG,N_i-1}^T, \ldots, v_{SG,1}^T, v_{S,i}^T]^T$ updated with the ML (e.g. neural network) optimisation step as represented by $\theta_i(\bullet)$, which outputs the composite embedding $\chi_{S,i}=[x_{SG,N_i}^T, x_{SG,N_i-1}^T, \ldots, x_{SG,1}^T, x_{S,i}^T]^T$. This is input to the ML module for training the ML model or classifier, the output of which may be fed back along feedback path 119 for use in updating the embedding model 304. The output of the ML model or classifier during training may be fed back along feedback path 119 to the embedding model 304 for updating the embedding model 304 for generating more suitable embeddings for the separable entities and associated entities for each training data item of the training data set. The embedding system 300 may be further configured for updating the embedding vocabulary dataset. For example, each of the embedding sub-vectors of the composite embedding $\chi_{S,i}=[x_{SG,N_i}^T, x_{SG,N_i-1}^T, \ldots, x_{SG,1}^T, x_{S,i}^T]^T$ may be fed back as embedding vocabulary feedback along feedback path 107 for updating the embeddings of the corresponding entities in the entity-embedding vocabulary dataset. The output of the ML model or classifier may be fed back along feedback path 119 to the embedding module 102, which is used by the embedding ML model 102a for updating the embedding ML model 102a for generating more suitable embeddings for the separable entities and associated entities for each training data item 112 of the training data set. The updated embeddings for each separable entity and also each entity associated with the separable entity generated by the embedding model 304 may be extracted and fed back, via embedding feedback path 107, for updating the corresponding separable entity-embedding mappings for the entity-embedding vocabulary dataset of the entity-embedding vocabulary encoding module 302 in relation to the separable entities and/or entities associated with the separable entities.

Thus, on the next training pass when the composite embeddings are generated for this training data item, the updated embeddings are read from the entity-embedding vocabulary dataset for each of the sub-vectors $v_{SG,N_i}, v_{SG,N_i-1}, \ldots v_{SG,1}$ of the $N_i$ entities associated with the i-th separable entity $S_i$ for this training data item. The updated embedding for sub-vector $v_{S,i}$ of the i-th separable entity $S_i$ is also read from the entity-embedding vocabulary dataset. The updated column vector $[v_{SG,N_i}^T, v_{SG,N_i-1}^T, \ldots, v_{SG,1}^T, v_{S,i}^T]^T$ is passed through the updated embedding model 304 (e.g. updated neural network structure represented by update function $\theta_i(\bullet)$), which outputs the updated composite embedding for the i-th separable entity as $\chi_{S,i}=[x_{SG,N_i}^T, x_{SG,N_i-1}^T, \ldots, x_{SG,1}^T, x_{S,i}^T]^T$, which is input to the ML module for the next training iteration of the ML model or classifier, the output of which may be fed back along feedback path 119 for use in updating the embedding model 304 for the next training iteration. This is repeated for all training data items of the training dataset until the ML model or classifier and/or the embedding model 304 are considered to be validly trained. Once validly trained, the updated embeddings for each of the separable entities and entities associated with the separable entity(ies) may be extracted and used to update, if needed, the embedding-entity vocabulary dataset. The entity-embedding vocabulary dataset may then be used directly for generating composite embeddings of queries for input to the trained ML model or classifier.

FIGS. 3a and 3b illustrates one or more training iterations for a training data item based on the sentence "Alzheimer's Disease is treated by modulating LRP1". In this example, 6 separable entities can be identified, which include: two separable biological entities of interest "Alzheimer's Disease" and "LRP1"; and 4 separable relationship/sentence entities "is", "treated", "by", and "modulating". The training data item may include data representative of these 6 separable entities and a label indicating whether the relationship is true or false. As described above, the first separable biological entity of interest (e.g. "Alzheimer's Disease") may be genericised or specificised using hierarchical graph 210 of FIG. 2b (or any other hierarchical disease ontology). In this case, the first separable biological entity of interest is genericised from "Alzheimer's Disease"→"neurodegenerative disease"→"neurological disease", in which the entity-embedding vocabulary encoding module 302 converts: the string "Alzheimer's Disease" into an embedding sub-vector $v_{AD}$ associated with the separable entity; the string "neurodegenerative disease" into an embedding sub-vector $v_{ND}$ for a genericised entity associated with the separable entity "Alzheimer's Disease"; and the string "neurological disease" into an embedding sub-vector $v_{Neuro}$ for another genericised entity associated with the separable entity "Alzheimer's Disease". The entity-embedding vocabulary encoding module 302 may represent these sub-vectors as a column embedding vector:

$$\begin{bmatrix} v_{Neuro} \\ v_{ND} \\ v_{AD} \end{bmatrix},$$

which maybe passed through the embedding model 304 to generate composite embedding vector $\chi_{AD}$ as:

$$\chi_{AD} = \Theta_{AD}\left(\begin{bmatrix} v_{Neuro} \\ v_{ND} \\ v_{AD} \end{bmatrix}\right) = \begin{bmatrix} x_{Neuro} \\ x_{ND} \\ x_{AD} \end{bmatrix}.$$

The second specific biological entity (e.g. "LRP1") may be genericised using hierarchical graph 200 of FIG. 2a (or any other hierarchical gene ontology) from "LRP1"→"Lipoprotein particle receptor"→"Gene/biological process", in which a NN converts the string "LRP1" to $v_{LRP1}$, a NN converts the string "Lipoprotein particle receptor" to $v_{LP}$, and a NN converts the string "Gene/biological process" to $v_{Gene}$, each of which can be represented by an composite embedding vector $X_{LRP1}$ as:

$$\chi_{LRP1} = \Theta_{LRP1}\left(\begin{bmatrix} v_{Gene} \\ v_{LP} \\ v_{LRP1} \end{bmatrix}\right) = \begin{bmatrix} x_{Gene} \\ x_{LP} \\ x_{LRP1} \end{bmatrix}$$

Similarly, the sentence entities or non-biological entities "is", "treated", "by", and "modulating" may be genericised using hierarchical graph 220 (or any other suitable hierarchical grammatical, grammar tree, syntax tree, natural language syntax or tagging information and the like). For example, "treated"→"verb", "modulating"→"verb", "is"→"verb", "by"→"conjunction" etc. Thus, a further four composite embedding vectors $x_{treat}$, $x_{mod}$, $x_{is}$, $x_{by}$ may be generated as:

$$\chi_{treat} = \Theta_{treat}\left(\begin{bmatrix} v_{verb} \\ v_{treat} \end{bmatrix}\right) = \begin{bmatrix} x_{verb} \\ x_{treat} \end{bmatrix};$$

$$\chi_{mod} = \Theta_{mod}\left(\begin{bmatrix} v_{verb} \\ v_{mod} \end{bmatrix}\right) = \begin{bmatrix} x_{verb} \\ x_{mod} \end{bmatrix};$$

$$\chi_{is} = \Theta_{is}\left(\begin{bmatrix} v_{verb} \\ v_{is} \end{bmatrix}\right) = \begin{bmatrix} x_{verb} \\ x_{is} \end{bmatrix};$$

$$\chi_{by} = \Theta_{by}\left(\begin{bmatrix} v_{conj} \\ v_{by} \end{bmatrix}\right) = \begin{bmatrix} x_{conj} \\ x_{by} \end{bmatrix}$$

Thus, the sentence "Alzheimer's Disease is treated by modulating LRP1" may be converted to a labelled training input instance as a set of composite embedding vectors $X=\{\chi_{AD}; \chi_{is}; \chi_{treat}; \chi_{by}; \chi_{mod}; \chi_{LRP1}\}$. Each composite embedding vector $\chi_i$ for the i-th entity of a sentence has multiple partitions, portions or sub-vectors, each partition or portion corresponding to either the specific entity or one of the genericised hierarchical entities associated with the i-th specific entity.

The set of composite embedding vectors may be input to an ML technique (e.g. an LSTM and the like) for training a ML model or classifier. For example, the composite embedding technique may be iteratively performed to generate a composite embedding X of each sentence in a labelled training dataset of sentences for input to a ML technique during training of the ML model/classifier. The neural networks of the composite embedding technique are thus trained to generate the corresponding set of composite embedding vectors $$X_i = \{\chi_k\}_{k=1}^{N_i+1}$$

for the i-th labelled training data sentence. This training may be performed in conjunction with training a ML model or classifier as the ML model/classifier may need to feed back results, for example via feedback path 119, to the neural network(s) of the composite embedding technique during training ensuring the neural network(s) of the composite embedding technique may be updated. Once the ML model/classifier is trained, i.e. the ML model/classifier accurately predicts/classifies a held-out labelled training test dataset of sentences, the NN(s) of the composite embedding technique may be fixed and then used for inputting sentences during testing/direct driven mode of the ML model/classifier.

Although the NN(s) when fixed may be used to generate a composite embedding for input text portions and/or sentences during testing/direct driven mode of the ML model/classifier, another method of using the embeddings learnt by the NN(s) based on the training dataset may be to extract the embeddings learnt into an embedding vocabulary dataset.

During training, the composite embedding technique may include a pre-processor phase that trains the NN(s) as described previously with reference to FIGS. 1a-3b based on a training dataset. The pre-processor phase is for generating a corpus of input entity embeddings or a vocabulary of input entity embeddings (a so-called embedding vocabulary) to keep track of all the entities that it has seen and the corresponding embeddings. The corpus of input entity embeddings maps the entity strings into corresponding vectors in an embedding vector space that may be a latent space generated by the NN(s) of the embedding technique during training. Essentially, all of the entities that are identified in all of the training sentences or data items of the labelled training dataset that are used to form embeddings of sub-vectors and subsequently composite embeddings may be used to form the corpus of input entity embeddings (or the embedding vocabulary dataset). Each of the embedding sub-vectors of the sets of composite embeddings $X_i$ that are generated during training may be stored as a mapping from a specific entity (e.g. an entity string in the sentence) to the corresponding entity embedding.

For example, the specific and generic entities from the training sentence "Alzheimer's Disease is treated by modulating LRP1", which include: two biological entities "Alzheimer's Disease" and "LRP1"; and 4 sentence relationship entities "is", "treated", "by", and "modulating", may be pre-processed for addition to the corpus of input entity embeddings (or embedding vocabulary dataset) by mapping each string entity with the corresponding embedding. The mappings that may be stored in the corpus of input entity embeddings to form an embedding vocabulary dataset which may be based on:

{"Alzheimer's Disease":→($x_{AD}$); "is":→($x_{is}$); "neurological disease":→($x_{Neuro}$); . . . ; . . . ;
"neurodegenerative disease":→($x_{ND}$); . . . ; "LRP1":→($x_{LRP1}$); . . . ; OOV:→($x_{OOV}$)}

The pre-processing phase may also determine the frequency of each identified entity that is identified during training. If the frequency of an identified entity is below a certain threshold (e.g. 5) or a value that is determined not often enough to suitably train the ML model/classifier in respect of that entity, then that entity and its embedding may not be included in the corpus of input entity embeddings and/or the resulting embedding vocabulary dataset. Typically, if the entity is rare in the labelled training set, then the embedding technique will not learn the embedding very well or develop a robust embedding for this entity, and/or the relationship described based on the entity will not be learnt well by the ML model/classifier. This means that that entity and its embedding should not be included in the embedding vocabulary dataset (or corpus of input entity embeddings).

One or more special or out of vocabulary input entity embeddings (e.g. "OOV" or "???") may also be generated to cater for entities not seen during training and which may be required when such entities are received in sentences, queries, and/or text portions during testing or direct-driven mode of, by way of example only but not limited to, the embedding system 300 of FIGS. 3a and 3b in which the corresponding composite embedding is input to the trained ML model or classifier. The corpus of input entity embeddings (or embedding vocabulary dataset) may be referred to for identifying when special or out-of-vocabulary entity embeddings should be used when inputting queries or test sentences into a trained ML model or classifier.

The entity-embedding vocabulary encoding module 302 of the embedding system 300 may be further configured, after training the embedding model and/or the ML model or classifier, to generate one or more composite embeddings of input queries, sentences or text portions for input to ML module 104 in relation to trained ML model or classifier. The composite embeddings of queries, sentences or text portions are for input to trained ML models and/or classifiers and the like. The composite embedding generation system 300 makes use of the embedding vocabulary dataset, which has been generated by the embedding system 300 in the previous pre-processing or training phase. It is assumed that the trained ML models and/or classifiers have been trained using an ML technique and the composite embeddings of the labelled training dataset. That is, the trained ML model/classifier was trained using labelled training data instances/items based on the composite embedding generated by the embedding model 304 of the embedding system 300. Now, the entity-embedding vocabulary encoding module 302 is configured to operate in a composite embedding input phase using the embedding vocabulary dataset for generating composite embeddings for sentences and/or queries and the like describing relationships with one or more entities of interest some of which may be unknown and not seen during training of the ML model/classifier.

For example, a sentence "Parkinson's disease is treated by regulating LRP1" might be retrieved from literature for input to an ML model trained for predicting whether the sentence is true; or this sentence may be input to a classifier for classifying whether this sentence provides evidence for this relation during relationship extraction. For this sentence, it is assumed that the entity of interest "Parkinson's disease" and also the sentence entity "regulating" were not featured or seen during training of the ML model and/or classifier nor during training of the embedding model 304 associated with the embedding system 300. This sentence was not part of the labelled training data instances used to train the ML model and/or classifier nor the embedding model 304. As described with reference to FIGS. 1a to 3b, the entity-embedding vocabulary encoding module 302 or entity-embedding analysis unit 102b may be further configured to use the embedding vocabulary dataset that was generated in the pre-processing phase to formulate a composite embedding for the sentence "Parkinson's disease is treated by regulating LRP1".

Each entity in the sentence "Parkinson's disease is treated by regulating LRP1" is identified and then an embedding vector is generated for each identified entity. In this case, there are 6 specific entities that can be identified in the sentence "Parkinson's disease is treated by regulating LRP1", which include: two biological entities of interest "Parkinson's disease" and "LRP1"; and 4 sentence/relationship entities "is", "treated", "by", and "regulating". Again, each entity may also be genericised/specificised using hierarchical graphs/trees (e.g. ontologies and/or tagging or syntactical rules/thesaurus and the like). So, several generic entities may be derived for each entity. For example, "Parkinson's disease"→"neurodegenerative disease"→"neurological disease"; "LRP1"→"lipoprotein"→"gene/biological process"; "treated"→"verb", "regulating"→"verb", "is"→"conjunction" etc. These may be derived from other portions of the hierarchical graphs 200, 210 and/or 220. Thus a set of entities may be generated for each separable entity, which are used to form a composite entity embedding.

For each set of entities associated with a separable entity, the entity-embedding vocabulary encoding module 302 identifies using the embedding vocabulary dataset (or corpus of input entity embeddings) whether an entity from the set of entities has been seen before (e.g. whether that entity exists in the embedding vocabulary dataset). If an entity in the set of entities for a separable entity has not been seen before, e.g. during training, then the corresponding special symbol or out-of-vocabulary (OOV) symbol embedding may be used in place of the unidentified entity. Those string entities from the set of entities that are identified to be in the embedding vocabulary dataset are used to retrieve the corresponding sub-vector embeddings they have been mapped to.

The composite embedding for the sentence "Parkinson's disease is treated by regulating LRP1" may be formed by using the embeddings already learnt during training and also OOV embeddings for those entities not identified to be part of the embedding vocabulary dataset. In this example, each set of entities associated with a separable entity includes the separable entity (e.g. entity of interest or relationship entity) and one or more entities associated with the separable entity (e.g. genericised entities and/or specificised entities associated with the separable entity). The set of entities associated with the specific entity of interest for "Parkinson's disease" includes {"Parkinson's disease"; "neurodegenerative disease"; "neurological disease" }. These are then used by the entity-embedding vocabulary encoding module 302 to retrieve the corresponding embeddings from the embedding vocabulary dataset.

In this case, the entity-embedding vocabulary encoding module 302 may determine through a search of the embedding vocabulary dataset or identify that the entity of interest "Parkinson's disease" has not been seen before, so this unidentified separable biological entity of interest may be mapped to a special out-of-vocabulary (OOV) symbol embedding (e.g. "Parkinson's disease"→$x_{OOV}$). The other entities in the set of entities associated with the specific biological entity of interest for "Parkinson's disease", generated from the hierarchical graph 210, include "neurodegenerative disease"; "neurological disease". These entities are identified by the entity-embedding vocabulary encoding module 302 to exist in the embedding vocabulary dataset. The embedding vectors associated with the identified entities associated with the specific biological entity of interest for "Parkinson's disease" are retrieved from the embedding vocabulary dataset. That is the sub-vector embeddings for the entity(ies) associated with the specific biological entity of interest for "Parkinson's disease" are read from the entity-embedding vocabulary dataset and include: ("neurodegenerative disease"→$x_{ND}$; "neurological disease"→$x_{Neuro}$). Thus, the entity-embedding vocabulary encoding module 302 may generate a composite embedding for the set of entities associated with "Parkinson's disease" as:

$$\chi_{PD} = \begin{bmatrix} x_{Neuro} \\ x_{ND} \\ x_{OOV} \end{bmatrix}.$$

Similarly, the set of entities associated with the separable relationship entity "regulating" includes {"regulating"; "verb" }. The entity-embedding vocabulary encoding module 302 is configured to identify that "regulating" has not been seen before or is determined by the user or system to be rare based on the embedding vocabulary dataset, where rarity may be based on the separable relationship entity occurring less than a certain number or frequency of occurrences (e.g. fewer than 5 times). In either case, this separable relationship entity, which has not been seen before or is determined to be rare, may be mapped to the special OOV symbol embedding (e.g. "regulating"→$x_{OOV}$). The other entity in the set of entities associated with the separable relationship entity "regulating" is the entity "verb" which the entity-embedding vocabulary encoding module 302 identifies has been seen before, or is not determined to be rare, based on the embedding vocabulary dataset, and so retrieves the corresponding vector embedding from the embedding vocabulary dataset, which is: ("verb"→$x_{verb}$). Thus, the entity-embedding vocabulary encoding module 302 generates a composite embedding for the set of entities associated with the separable relationship entity "regulating" as:

$$\chi_{reg} = \begin{bmatrix} x_{verb} \\ x_{OOV} \end{bmatrix}.$$

The remaining sets of entities associated with "LRP1", "is", "treated", and "by" are identified by the entity-embedding vocabulary encoding module 302 to be in the embedding vocabulary dataset as they were seen during training of at least the training sentence "Alzheimer's Disease is treated by modulating LRP1" (e.g. see FIGS. 3a and 3b) the corresponding composite embeddings for "LRP1", "treated", "is", and "by" may thus be read from the embedding vocabulary dataset to form:

$$\chi_{LRP1} = \begin{bmatrix} x_{Gene} \\ x_{LP} \\ x_{LRP1} \end{bmatrix};$$

$$\chi_{treat} = \begin{bmatrix} x_{verb} \\ x_{treat} \end{bmatrix};$$

$$\chi_{is} = \begin{bmatrix} x_{conj} \\ x_{is} \end{bmatrix};$$

$$\chi_{by} = \begin{bmatrix} x_{conj} \\ x_{by} \end{bmatrix}.$$

The entity-embedding vocabulary encoding module 302 then combines each of the composite embeddings for each specific entity into a set of composite embedding vectors (or a matrix of composite embeddings depending on the size of the composite embedding vectors). For example, the entity-embedding vocabulary encoding module 302 may generate the set of composite embeddings for the sentence "Parkinson's disease is treated by regulating LRP1" as:

$$x_{PD} = \left\{ \begin{bmatrix} x_{Neuro} \\ x_{ND} \\ x_{OOV} \end{bmatrix}; \begin{bmatrix} x_{conj} \\ x_{is} \end{bmatrix}; \begin{bmatrix} x_{verb} \\ x_{treat} \end{bmatrix}; \begin{bmatrix} x_{conj} \\ x_{by} \end{bmatrix}; \begin{bmatrix} x_{verb} \\ x_{OOV} \end{bmatrix}; \begin{bmatrix} x_{Gene} \\ x_{LP} \\ x_{LRP1} \end{bmatrix} \right\}$$

$$= \{\chi_{PD}; \chi_{is}; \chi_{treat}; \chi_{by}; \chi_{reg}; \chi_{LRP1}\}.$$

The set of composite embeddings $X_{PD}$ for the input sentence "Parkinson's disease is treated by regulating LRP1" may then be input to the ML model/classifier.

The above-mentioned method(s) and/or techniques as described with respect to FIGS. 1a-3b may be used for, byway of example only but is not limited to, relationship extraction. An ML model may be generated by an ML technique that is trained based on a labelled training set of sentences describing one or more relationships between two or more entities, which are input using the embedding system 300. The trained ML model may be used for relationship extraction, in which the ML model is configured to indicate whether an input sentence extracted from literature or a scientific article of a corpus of literature provides evidence of a particular relationship between two or more biological entities of interest. This can be used to process scientific articles using the trained ML model. Essentially, the embedding system 300 allows an ML model to be trained to read papers etc.

For example, sentences with two or more biological entities of interest may be extracted from each scientific article from a corpus of literature. For each sentence including a biological entity of interest such as gene/disease, then the embedding system 300 may be used to input a composite embedding of this sentence to the trained ML model. The ML model may then output an indication whether this input sentence corresponds to a relationship of interest. If it does correspond to a relationship of interest, then the sentence and the citation of the scientific article with which it relates may be added to a relationship extraction database. This may be used to extract facts when needed in relation to the biological entities of interest stored therein. For example, the trained ML model may be configured to read articles, citations, and extract evidence to use as further labelled training data or to give to scientists etc. Thus, relationships may be used by scientists, or other models, exploring areas useful to retrieve genes associated with disease etc.

Figure 4A:
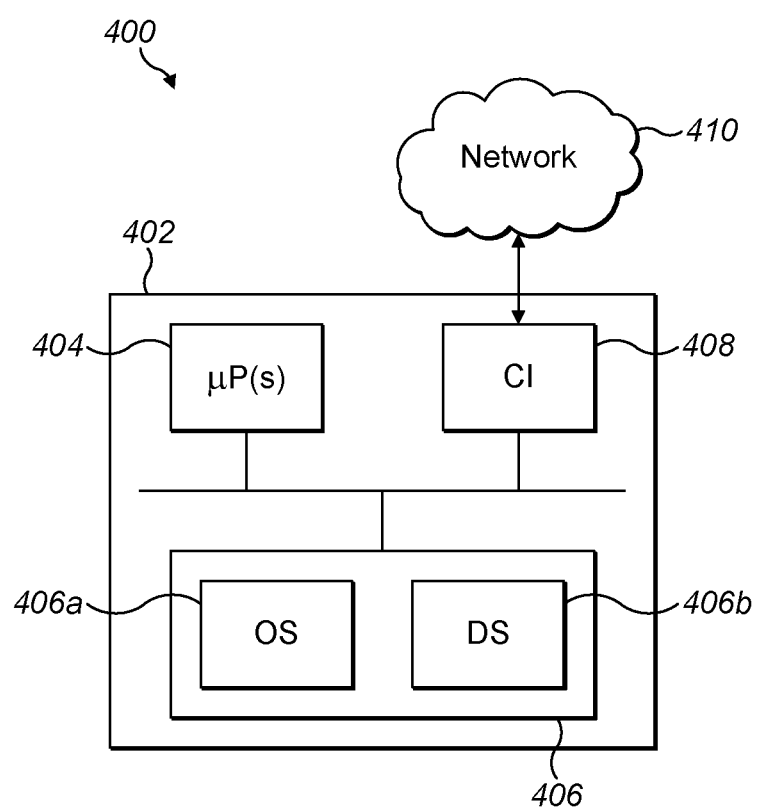
FIG. 4a is a schematic diagram illustrating a computing system and computing device/apparatus according to the present disclosure.

FIG. 4a is a schematic diagram illustrating a computing system 400 that may be used to implement one or more aspects of the embedding system, embedding module, entity-embedding vocabulary module, embedding models, and/or ML modules/ML models and/or classifiers according to the invention and/or includes the methods, process(es) and/or system(s) and apparatus as described with reference to FIGS. 1a-3b. Computing system includes a computing device 402, the computing device including one or more processor unit(s) 404, memory unit 406 and communication interface 408 in which the one or more processor unit(s) 404 are connected to the memory unit 406 and the communication interface 408. The communications interface 408 may connect the computing device 402 with one or more databases or other processing system(s) or computing device(s) over one or more networks 410. The memory unit 406 may store one or more program instructions, code or components such as, by way of example only but not limited to, an operating system 406a for operating computing device 402 and a data store 406b for storing additional data and/or further program instructions, code and/or components associated with implementing the functionality and/or one or more function(s) or functionality associated with one or more of the method(s) and/or process(es) of the apparatus, module(s), mechanisms and/or system(s)/platforms/architectures; modifications thereof; combinations thereof; as described herein and/or as described with reference to at least one of figure(s) 1a to 3b.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform the system(s), apparatus, method(s) and/or process(es); modifications thereof; combinations thereof; as described herein; and/or as described with reference to FIGS. 1a to 3b.

Further additional aspects of the invention may include an apparatus for embedding a portion of text describing a relationship for one or more entities of interest, the apparatus comprising a processor coupled to a communication interface. The communication interface may be configured to receive a portion of text including data representative of a relationship for the one or more entity(ies) of interest, where the portion of text comprises multiple separable entities, the multiple separable entities including one or more relationship entity(ies) and the one or more entity(ies) of interest. The processor may be configured to: generate a set of embeddings for each of the multiple separable entities of the received portion of text, wherein each set of embeddings associated with a separable entity comprises an embedding of the separable entity and an embedding for one or more entities associated with the separable entity. One or more composite embedding(s) may be formed for the received portion of text, where a composite embedding includes at least one embedding from each of the multiple sets of embeddings associated with the received portion of text. In other examples, the composite embedding may include the multiple sets of embeddings associated with the received portion of text. The communication interface may be further configured to send the composite embedding(s) of the received portion of text for input to a machine learning, ML, model or classifier.

Yet further aspects of the invention may include an apparatus for generating an embedding vocabulary dataset for embedding one or more portions of text describing a relationship for one or more entities of interest. The apparatus including at least a processor coupled to a communication interface. The communication interface is configured to receive a labelled training data item of a labelled training dataset. The labelled training dataset including a plurality of labelled training data items, where the labelled training data item corresponds to a portion of text comprising data representative of multiple separable entities including the one or more relationship entity(ies) and the one or more entity(ies) of interest associated with the portion of text. The processor is configured to: generate, using an ML embedding model, a set of embeddings for each of the multiple separable entities of the portion of text, where each set of embeddings associated with a separable entity comprises an embedding of the separable entity and an embedding of one or more entities associated with the separable entity. The one or more entities associated with the separable entity may be selected entities based on parsing a hierarchical graph or tree or entity association data structure associated with the separable entity. A composite embedding may be formed based on at least one embedding from each of the multiple sets of embeddings. In some embodiments, a composite embedding may be formed based on combining the multiple sets of embeddings. The communication interface may be further configured to send the composite embedding of the received labelled training data item for input to train a machine learning, ML, model or classifier based on the labelled training dataset. The processor may be further configured to update the ML embedding model for generating the set of embeddings based on the ML model or classifier output during training. After training, the processor may be further configured to extract the embeddings associated with the separable entities and entities associated with the separable entities to form an entity embedding vocabulary dataset.

Figure 4B:
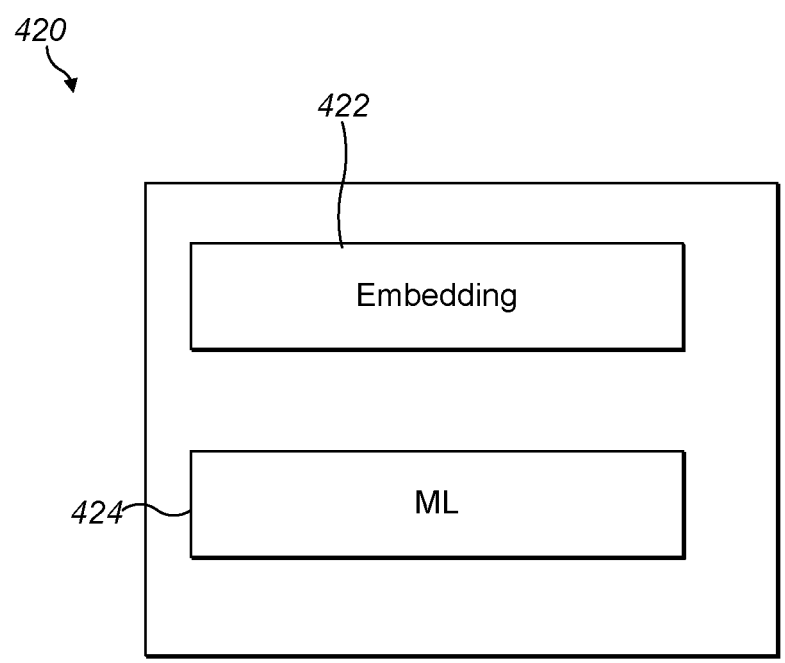
FIG. 4b is a schematic diagram illustrating a system for generating and/or using composite embeddings according to the present disclosure.

FIG. 4b is a schematic diagram illustrating a system 420 for generating and/or using composite embeddings according to the invention. The system 420 includes an embedding module 422 configured to generate a composite embedding of one or more text portions, one or more sentences and/or training datasets comprising a plurality of training data items, each training data item comprising data representative of a text portion and the like. The embedding module 422 may include the functionality of the method(s), process(es), and/or system(s) associated with the invention as described herein, modifications thereof, combinations thereof, or as described herein, and/or as described with reference to any of FIGS. 1a-4b for providing a composite embedding, for generating an embedding vocabulary dataset for generating further composite embeddings, and/or for training ML models and classifiers and generating input for trained ML models and/or classifiers and the like. The system 420 further includes an ML module 424 configured to receive, from the embedding module 422 one or more composite embeddings of portions of text, queries, sentences and/or training data items for use in training one or more ML models and/or classifiers and/or for use in inputting the composite embedding to trained ML models and/or classifiers that have been trained on composite embeddings of training datasets. The ML module 424 may include the functionality of the method(s), process(es), and/or system(s) associated with the invention as described herein, modifications thereof, combinations thereof, and/or as described with reference to FIGS. 1a-4b for providing trained ML models and/or classifiers based on the composite embedding and for inputting the composite embedding of text portions, queries, sentences and/or training data items to one or more ML models and/or classifiers and the like. Furthermore, the system 420 may include the functionality of the method(s), process(es), and/or system(s) associated with the invention as described herein, combinations thereof, modifications thereof, variants thereof, and/or as described with reference to FIGS. 1a-4b for providing a composite embedding to one or more ML models and/or classifiers for training and/or for input to trained ML models and/or classifiers, ML models and/or classifiers trained on composite embedding training datasets, composite embedding techniques and/or embedding modules, and/or embedding vocabulary datasets for generating composite embeddings, and the like.

In the embodiment(s) described above the method(s), apparatus, system(s) and/or computing system/device(s) may be implemented by a server, the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic or semi-automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single apparatus or system, it is to be understood that the computing device or system may be a distributed system or part of a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface). Furthermore, the systems, apparatus, and/or method(s) as described herein may be distributed or located remotely and accessed via a network or other communication link (e.g. using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements. As used herein, the terms "module", "component" and/or "system" are intended to encompass computer-readable data storage that is configured with computer-executable instructions that cause certain functionality to be performed when executed by a processor. The computer-executable instructions may include a routine, a function, or the like. It is also to be understood that a module, component and/or system may be localized on a single device or distributed across several devices. Further, as used herein, the term "exemplary" is intended to mean "serving as an illustration or example of something". Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method for embedding a portion of text describing a relationship for one or more entities of interest, the method comprising:
   receiving a portion of text comprising data representative of a relationship for the one or more entities of interest, wherein the portion of text comprises multiple separable entities including one or more relationship entities and the one or more entities of interest;
   for each of the multiple separable entities, generating a set of embeddings by (a) retrieving, from an embedding vocabulary dataset, one or more embeddings of entities associated with the separable entity and (b) forming a set of embeddings associated with the separable entity based on the retrieved one or more embeddings, wherein each set of embeddings comprises an embedding of the separable entity and at least one embedding of an entity associated with the separable entity;
   sending at least one embedding from each of the sets of embeddings for input to a machine learning model or classifier; and
   storing the generated sets of embeddings in the embedding vocabulary dataset, wherein the embedding vocabulary dataset comprises data representative of one or more entities mapped to one or more corresponding embeddings,
   wherein,
   retrieving from the embedding vocabulary dataset one or more embeddings of entities associated with a separable entity further comprises (a) determining whether an embedding corresponding to each of the separable entity and the one or more entities associated with the separable entity exists in the embedding vocabulary dataset, (b) retrieving those embeddings associated with the separable entity that exist in the embedding vocabulary dataset, (c) generating out-of-vocabulary embeddings for those embeddings associated with the separable entity that are not found in the embedding vocabulary dataset, and (d) generating a set of embeddings for the separable entity based on at least any retrieved embedding or any generated out-of-vocabulary embedding.

2. The computer-implemented method as claimed in claim 1, further comprising:
   forming a composite embedding for the received portion of text, the composite embedding comprising combining at least one embedding from each of the multiple sets of embeddings associated with the received portion of text; and
   sending the composite embedding of the received portion of text for input to the machine learning model or classifier.

3. The computer-implemented method as claimed in claim 1, further comprising:
   forming a composite embedding for the received portion of text, the composite embedding comprising combining all the multiple sets of embeddings associated with the received portion of text; and
   sending the composite embedding of the received portion of text for input to the machine learning model or classifier.

4. The computer-implemented as claimed in claim 1, wherein the portion of text comprises:
   a labelled training data item comprising data representative of one or more entities of interest and one or more relationship entities associated with a label for training the machine learning model or classifier; a query comprising data representative of one or more entities of interest and one or more relationship entities for inputting to a trained machine learning model or classifier, or both.

5. The computer-implemented method as claimed in claim wherein the embedding vocabulary dataset further comprises a mapping from each of the one or more entities associated with a separable entity to the separable entity.

6. The computer-implemented method as claimed in claim further comprising:
   generating the embedding vocabulary dataset based on training an embedding model using a labelled training dataset representative of a plurality of portions of text, the labelled training dataset comprising a plurality of labelled training data items, each labelled training data item comprising data representative of multiple separable entities including the one or more relationship entities and the one or more entities of interest associated with at least one of the portions of text.

7. The computer-implemented method as claimed in claim 6, the step of generating the embedding vocabulary dataset further comprising:
   iteratively training the embedding model and the machine learning model or classifier based on the labelled training dataset, the embedding model configured to generate a plurality of sets of embeddings associated with the labelled training dataset for inputting to the machine learning model or classifier during training; and
   extracting, from the embedding model, the generated sets of embeddings; and
   storing the extracted sets of embeddings as the embedding vocabulary dataset.

8. The computer-implemented method as claimed in claim 1, wherein the embedding model, or the machine learning model or classifier are based on at least one or more machine learning techniques from the group consisting of:
   feedforward neural network(s);
   recursive neural network(s);
   convolutional neural network(s);
   autoencoder neural network(s);
   any one or more neural network structures based on tensor factorization;

any one or more neural network structures based on projecting data representative of entities into a latent vector space;

any one or more neural network structures capable of embedding data or suitable for the embedding ML model as the application demands; and any one or more neural network structures suitable for the corresponding ML model or classifier as the application demands.

9. The computer-implemented method as claimed in claim 1, the step of generating the set of embeddings for each of the multiple separable entities, the multiple separable entities including one or more separable relationship entities and the one or more separable entities of interest associated with a portion of text, further comprising:

generating a set of embeddings for each of the separable entities, wherein each set of embeddings comprises a specific embedding element and one or more further embedding element(s), the specific embedding element corresponding to the embedding of one of the entities of interest of the portion of text and each further embedding element corresponding to an embedding of a further entity associated with the one of the entities of interest; and generating a set of relationship embeddings for each of the one or more separable relationship entities, wherein each set of relationship embeddings comprises a specific relationship embedding element and one or more further relationship embedding elements, the specific relationship element corresponding to an embedding of one of the separable relationship entities, and each further relationship embedding element corresponding to an embedding of a relationship entity associated with the one of the separable relationship entities.

10. The computer-implemented method as claimed in claim 9 further comprising forming a composite embedding for the received portion of text based on combining the one or more set(s) of embeddings of interest and the one or more sets of relationship embeddings.

11. The computer-implemented method as claimed in claim 1, wherein each of the sets of embeddings for the multiple separable entities comprises an embedding vector, the embedding vector comprising multiple sub-vectors associated with the embeddings of the separable entity and the at least one embedding of the entities associated with the separable entity.

12. The computer-implemented method as claimed in claim 11, the multiple sub-vectors comprising:

a specific sub-vector comprising data representative of the embedding of the separable entity; and a further sub-vector comprising data representative of the embedding of the at least one entity associated with the separable entity.

13. The computer-implemented method as claimed in claim 1, the method further comprising inputting at least one embedding from each of the sets of embeddings to an machine learning model or classifier trained for predicting whether there is evidence supporting the relationship of the portion of text.

14. The computer-implemented method as claimed in claim 13, wherein the portion of text comprises one or more unknown entities associated with one or more relationship entities of a relationship.

15. The computer-implemented method as claimed in claim 1, the method further comprising forming a composite embedding based on the sets of embeddings for each of a plurality of portions of text, and inputting the composite embedding to a machine learning model or classifier trained for predicting whether there is evidence supporting the relationship of the portion of text.

16. The computer-implemented method as claimed in claim 1, further comprising forming a composite embedding based on the sets of embeddings for each of a plurality of portions of text, and inputting each composite embedding to an machine learning model or classifier trained for identifying a particular relationship for one or more entities of interest, the machine learning model or classifier configured to output evidence for each of the plurality of portions of text exhibiting the particular relationship.

17. The computer-implemented method as claimed in claim 1, wherein generating a set of embeddings further comprises:

generating each embedding of a set of embeddings for a separable entity separately; or generating the embedding of a set of embeddings for a separable entity jointly.

18. An apparatus comprising:

one or more computer processors;

a computer-processor readable storage medium;

an interface via which a portion of text can be received; and computer processor executable instructions stored in the storage medium that when executed by the one or more computer processors cause the apparatus to:

receive a portion of text comprising data representative of a relationship for the one or more entities of interest, wherein the portion of text comprises multiple separable entities including one or more relationship entities and the one or more entities of interest;

for each of the multiple separable entities, generate a set of embeddings by (a) retrieving, from an embedding vocabulary dataset, one or more embeddings of entities associated with the separable entity and (b) forming a set of embeddings associated with the separable entity based on the retrieved one or more embeddings, wherein each set of embeddings comprises an embedding of the separable entity and at least one embedding of an entity associated with the separable entity;

send at least one embedding from each of the sets of embeddings for input to a machine learning model or classifier; and store the generated sets of embeddings in the embedding vocabulary dataset, wherein the embedding vocabulary dataset comprises data representative of one or more entities mapped to one or more corresponding embeddings, wherein, retrieving from the embedding vocabulary dataset one or more embeddings of entities associated with a separable entity further comprises (a) determining whether an embedding corresponding to each of the separable entity and the one or more entities associated with the separable entity exists in the embedding vocabulary dataset, (b) retrieving those embeddings associated with the separable entity that exist in the embedding vocabulary dataset, (c) generating out-of-vocabulary embeddings for those embeddings associated with the separable entity that are not found in the embedding vocabulary dataset, and (d) generating a set of embeddings for the separable entity based on at least any retrieved embedding or any generated out-of-vocabulary embedding.

19. The apparatus of claim 18, wherein, when executed by the one or more computer processors, the computer processor executable instructions further cause the apparatus to:
  form a composite embedding for the received portion of text, the composite embedding comprising combining at least one embedding from each of the multiple sets of embeddings associated with the received portion of text; and
  send the composite embedding of the received portion of text for input to the machine learning model or classifier.

20. The apparatus of claim 18, wherein, when executed by the one or more computer processors, the computer processor executable instructions further cause the apparatus to:
  form a composite embedding for the received portion of text, the composite embedding comprising combining all the multiple sets of embeddings associated with the received portion of text; and
  send the composite embedding of the received portion of text for input to the machine learning model or classifier.

21. The apparatus of claim 18, wherein the portion of text comprises:
  a labelled training data item comprising data representative of one or more entities of interest and one or more relationship entities associated with a label for training the machine learning model or classifier;
  a query comprising data representative of one or more entities of interest and one or more relationship entities for inputting to a trained machine learning model or classifier;
  or both.

22. The apparatus of claim 18, wherein the embedding vocabulary dataset further comprises a mapping from each of the one or more entities associated with a separable entity to the separable entity.

23. The apparatus of claim 18, wherein, when executed by the one or more computer processors, the computer processor executable instructions further cause the apparatus to:
  generate the embedding vocabulary dataset based on training an embedding model using a labelled training dataset representative of a plurality of portions of text, the labelled training dataset comprising a plurality of labelled training data items, each labelled training data item comprising data representative of multiple separable entities including the one or more relationship entities and the one or more entities of interest associated with at least one of the portions of text.

24. The apparatus of claim 23, wherein to cause the apparatus to generate the embedding vocabulary dataset, when executed by the one or more computer processors, the computer executable instructions cause the apparatus to:
  iteratively train the embedding model and the machine learning model or classifier based on the labelled training dataset, the embedding model configured to generate a plurality of sets of embeddings associated with the labelled training dataset for inputting to the machine learning model or classifier during training;
  extract, from the embedding model, the generated sets of embeddings; and
  store the extracted sets of embeddings as the embedding vocabulary dataset.

25. The apparatus of claim 18, wherein the embedding model, or the machine learning model or classifier are based on at least one or more machine learning techniques from the group consisting of:
  feedforward neural network(s);
  recursive neural network(s);
  convolutional neural network(s);
  autoencoder neural network(s);
  any one or more neural network structures based on tensor factorization;
  any one or more neural network structures based on projecting data representative of entities into a latent vector space;
  any one or more neural network structures capable of embedding data or suitable for the embedding ML model as the application demands; and
  any one or more neural network structures suitable for the corresponding ML model or classifier as the application demands.

26. A non-transitory computer processor readable storage medium comprising computer processor executable instructions stored in the storage medium that when executed by one or more computer processors cause an apparatus to:
  receive a portion of text comprising data representative of a relationship for the one or more entities of interest, wherein the portion of text comprises multiple separable entities including one or more relationship entities and the one or more entities of interest;
  for each of the multiple separable entities, generate a set of embeddings by (a) retrieving, from an embedding vocabulary dataset, one or more embeddings of entities associated with the separable entity and (b) forming a set of embeddings associated with the separable entity based on the retrieved one or more embeddings, wherein each set of embeddings comprises an embedding of the separable entity and at least one embedding of an entity associated with the separable entity;
  send at least one embedding from each of the sets of embeddings for input to a machine learning model or classifier; and
  store the generated sets of embeddings in the embedding vocabulary dataset, wherein the embedding vocabulary dataset comprises data representative of one or more entities mapped to one or more corresponding embeddings,
  wherein,
  retrieving from the embedding vocabulary dataset one or more embeddings of entities associated with a separable entity further comprises (a) determining whether an embedding corresponding to each of the separable entity and the one or more entities associated with the separable entity exists in the embedding vocabulary dataset, (b) retrieving those embeddings associated with the separable entity that exist in the embedding vocabulary dataset, (c) generating out-of-vocabulary embeddings for those embeddings associated with the separable entity that are not found in the embedding vocabulary dataset, and (d) generating a set of embeddings for the separable entity based on at least any retrieved embedding or any generated out-of-vocabulary embedding.

27. The non-transitory computer processor readable storage medium of claim 26, comprising further computer processor executable instructions that, when executed by the one or more computer processors, cause the apparatus to:
  form a composite embedding for the received portion of text, the composite embedding comprising combining at least one embedding from each of the multiple sets of embeddings associated with the received portion of text; and send the composite embedding of the received portion of text for input to the machine learning model or classifier.

28. The non-transitory computer processor readable storage medium of claim 26, comprising further computer processor executable instructions that, when executed by the one or more computer processors, cause the apparatus to:
- form a composite embedding for the received portion of text, the composite embedding comprising combining all the multiple sets of embeddings associated with the received portion of text; and
- send the composite embedding of the received portion of text for input to the machine learning model or classifier.

29. The non-transitory computer processor readable storage medium of claim 26, wherein the portion of text comprises:
- a labelled training data item comprising data representative of one or more entities of interest and one or more relationship entities associated with a label for training the machine learning model or classifier;
- a query comprising data representative of one or more entities of interest and one or more relationship entities for inputting to a trained machine learning model or classifier;
- or both.

30. The non-transitory computer processor readable storage medium of claim 26, wherein the embedding vocabulary dataset further comprises a mapping from each of the one or more entities associated with a separable entity to the separable entity.

31. The non-transitory computer processor readable storage medium of claim 26, comprising further computer processor executable instructions that, when executed by the one or more computer processors, cause the apparatus to:
- generate the embedding vocabulary dataset based on training an embedding model using a labelled training dataset representative of a plurality of portions of text, the labelled training dataset comprising a plurality of labelled training data items, each labelled training data item comprising data representative of multiple separable entities including the one or more relationship entities and the one or more entities of interest associated with at least one of the portions of text.

32. The non-transitory computer processor readable storage medium of claim 31, comprising further computer processor executable instructions that, when executed by the one or more computer processors, cause the apparatus to:
- iteratively train the embedding model and the machine learning model or classifier based on the labelled training dataset, the embedding model configured to generate a plurality of sets of embeddings associated with the labelled training dataset for inputting to the machine learning model or classifier during training;
- extract, from the embedding model, the generated sets of embeddings; and
- store the extracted sets of embeddings as the embedding vocabulary dataset.

33. The non-transitory computer processor readable storage medium of claim 26, wherein the embedding model, or the machine learning model or classifier are based on at least one or more machine learning techniques from the group consisting of:
- feedforward neural network(s);
- recursive neural network(s);
- convolutional neural network(s);
- autoencoder neural network(s);
- any one or more neural network structures based on tensor factorization;
- any one or more neural network structures based on projecting data representative of entities into a latent vector space;
- any one or more neural network structures capable of embedding data or suitable for the embedding ML model as the application demands; and
- any one or more neural network structures suitable for the corresponding ML model or classifier as the application demands.

* * * * *